(12) United States Patent
Tsukagoshi

(10) Patent No.: US 9,998,773 B2
(45) Date of Patent: Jun. 12, 2018

(54) TRANSMISSION DEVICE, TRANSMISSION METHOD OF TRANSMISSION STREAM, AND PROCESSING DEVICE

(71) Applicant: SONY CORPORATION, Tokyo (JP)

(72) Inventor: Ikuo Tsukagoshi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 155 days.

(21) Appl. No.: 14/787,586

(22) PCT Filed: May 15, 2014

(86) PCT No.: PCT/JP2014/063004
§ 371 (c)(1),
(2) Date: Oct. 28, 2015

(87) PCT Pub. No.: WO2014/196336
PCT Pub. Date: Dec. 11, 2014

(65) Prior Publication Data
US 2016/0112731 A1  Apr. 21, 2016

(30) Foreign Application Priority Data

Jun. 7, 2013 (JP) ................................ 2013-120621

(51) Int. Cl.
*H04N 21/236* (2011.01)
*H04N 21/845* (2011.01)
(Continued)

(52) U.S. Cl.
CPC ... *H04N 21/23614* (2013.01); *H04L 65/4076* (2013.01); *H04L 65/608* (2013.01);
(Continued)

(58) Field of Classification Search
CPC . H04L 65/4076; H04L 65/608; H04N 21/236; H04N 21/23605; H04N 21/23614;
(Continued)

(56) References Cited

U.S. PATENT DOCUMENTS

| | | |
|---|---|---|
| 2002/0071434 A1 | 6/2002 | Furukawa |
| 2011/0176551 A1 | 7/2011 | Chawla et al. |
| 2012/0185907 A1* | 7/2012 | Park ..................... H04N 21/236 725/110 |
| 2013/0094518 A1 | 4/2013 | Bae |
| 2014/0282798 A1* | 9/2014 | Hwang ............... H04L 65/4076 725/116 |

(Continued)

FOREIGN PATENT DOCUMENTS

| | | |
|---|---|---|
| EP | 2 190 202 A1 | 5/2010 |
| EP | 2190202 A1 | 5/2010 |

(Continued)

OTHER PUBLICATIONS

Extended European Search Report dated Nov. 14, 2016 in Patent Application No. 14808252.2.

(Continued)

*Primary Examiner* — Paul H Masur
(74) *Attorney, Agent, or Firm* — Oblon, McClelland, Maier & Neustadt, L.L.P.

(57) ABSTRACT

A response time until initial presentation decreases in such cases as reception of a service and reproduction of reception data after accumulation of the reception data.
Identification information based on which a packet handled with priority is identifiable is inserted into each of transmission packets at the time of transmission of a transmission stream containing the transmission packets disposed successively in the transmission stream. For example, each of the transmission packets is a multilayered packet containing a multiplexed transport packet in the uppermost layer. For example, the identification information is inserted into packets in a part or all of layers of each of the multilayered packets.

19 Claims, 25 Drawing Sheets

(51) Int. Cl.
  *H04N 21/854* (2011.01)
  *H04L 29/06* (2006.01)
  *H04N 21/2389* (2011.01)
  *H04N 21/63* (2011.01)
  *H04N 21/643* (2011.01)

(52) U.S. Cl.
  CPC ..... *H04N 21/236* (2013.01); *H04N 21/23605* (2013.01); *H04N 21/23892* (2013.01); *H04N 21/631* (2013.01); *H04N 21/64322* (2013.01); *H04N 21/8455* (2013.01); *H04N 21/85406* (2013.01)

(58) Field of Classification Search
  CPC ........... H04N 21/23892; H04N 21/631; H04N 21/64322; H04N 21/8455; H04N 21/85406
  See application file for complete search history.

(56) References Cited

U.S. PATENT DOCUMENTS

| | | | | |
|---|---|---|---|---|
| 2014/0282799 | A1* | 9/2014 | Bae | H04N 21/236 725/116 |
| 2014/0344470 | A1* | 11/2014 | Lee | H04N 21/236 709/231 |
| 2015/0020138 | A1* | 1/2015 | Bae | H04N 21/2343 725/116 |
| 2015/0146797 | A1* | 5/2015 | Lee | H04N 21/2387 375/240.25 |
| 2016/0094687 | A1* | 3/2016 | Kwon | H04N 21/6332 370/474 |

FOREIGN PATENT DOCUMENTS

| | | |
|---|---|---|
| JP | 2001-148853 | 5/2001 |
| JP | 2001-148853 A | 5/2001 |
| JP | 2002-141945 | 5/2002 |
| JP | 2002-141945 A | 5/2002 |
| JP | 2008-301139 | 12/2008 |
| JP | 2008-301139 A | 12/2008 |
| JP | 2010-502039 | 1/2010 |
| JP | 2011-103568 | 5/2011 |
| JP | 2012-15875 A | 1/2012 |

OTHER PUBLICATIONS

Eun-Seok Ryu, et al., "On Video Frame Priority Syntax for MMT Packet Header" InterDigital Communications, XP030057790, Apr. 2013, 6 Pages.

Sung Oh Hwang, et al., "Guidelines on how to provide MMT transport over Broadcasting Network" MMT over DVB-T2 Participants, XP030058054, Apr. 2014, 9 Pages.

"Recommendation ITU-R BT.1869 Multiplexing scheme for variable-length packets in digital multimedia broadcasting systems" BT Series Broadcasting Service (television), XP055316097, Mar. 2010, pp. 1-18 with cover pages.

Gerard Fernando, et al., "Technologies under Consideration (TuC) for MMT" Systems/MMT, XP030018830, Dec. 2011, pp. 1-71.

Japanese Office Action dated Jan. 16, 2018 in Application No. 2015-521367 (with English translation), 7 pages.

Chinese Office Action dated Feb. 28, 2018 in corr. Chinese Patent Application No. 201480031381.8, filed May 15, 2014 (w/ English translation) 15 pp.

\* cited by examiner

FIG. 3

| Syntax | No. of Bits | Format |
|---|---|---|
| TMCC ( ){ | | |
| for( 0 ; N < 120 ; N++) { | | |
| RELATIVE STREAM NO. | 4 | uimslbf |
| } | | |
| for ( 0 ; M < 15 ; M++) { | | |
| TRANSMISSION STREAM ID | 16 | uimslbf |
| STREAM TYPE | 8 | bslbf |
| } | | |
| for( 0 ; p < 120; p++){ | | |
| slot p top pointer | 16 | bslbf |
| slot p last pointer | 16 | bslbf |
| } | | |
| for ( 0; n < 15; n++){ | | |
| RELATIVE STREAM N packet_length | 16 | uimslbf |
| RELATIVE STREAM SYNCHRONOUS PATTERN BIT LENGTH | 8 | uimslbf |
| RELATIVE STREAM SYNCHRONOUS PATTERN | 32 | bslbf |
| } | | |
| } | | |

| RELATIVE STREAM 0 STREAM TYPE | RELATIVE STREAM 1 STREAM TYPE | RELATIVE STREAM 2 STREAM TYPE | ... | RELATIVE STREAM 15 STREAM TYPE |
|---|---|---|---|---|
| 8 | 8 | 8 | | 8 |

(b)

| VALUE | ALLOCATION |
|---|---|
| 00000000 | NOT DEFINED |
| 00000001 | MPEG2-TS |
| 00000010 | TLV |
| 00000011 ~ 11111110 | NOT DEFINED |
| 11111111 | NO ALLOCATION TYPE |

FIG. 6
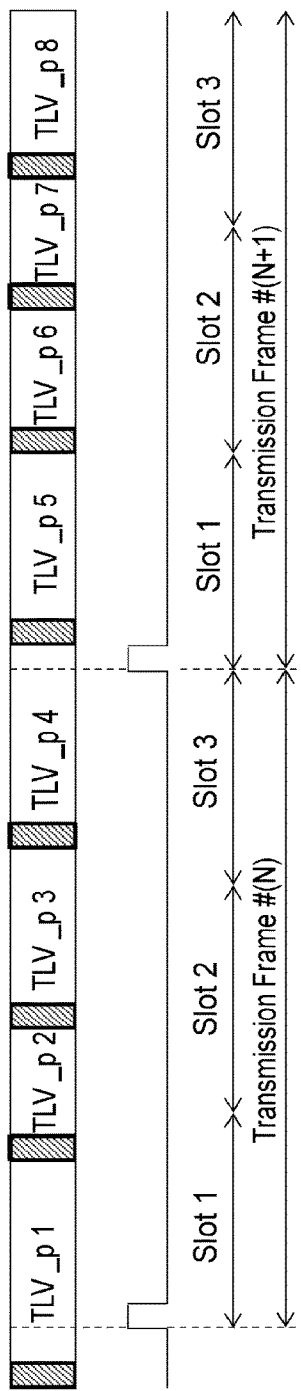
(a) EXAMPLE OF TLV PACKET POSITION INDEPENDENT OF TRANSMISSION FRAME START
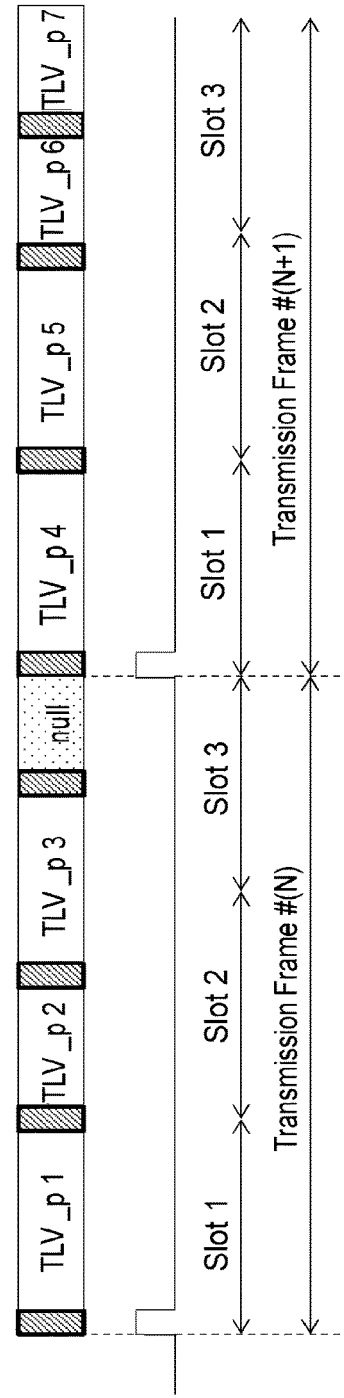
(b) EXAMPLE OF TLV PACKET POSITION DEPENDENT ON TRANSMISSION FRAME START

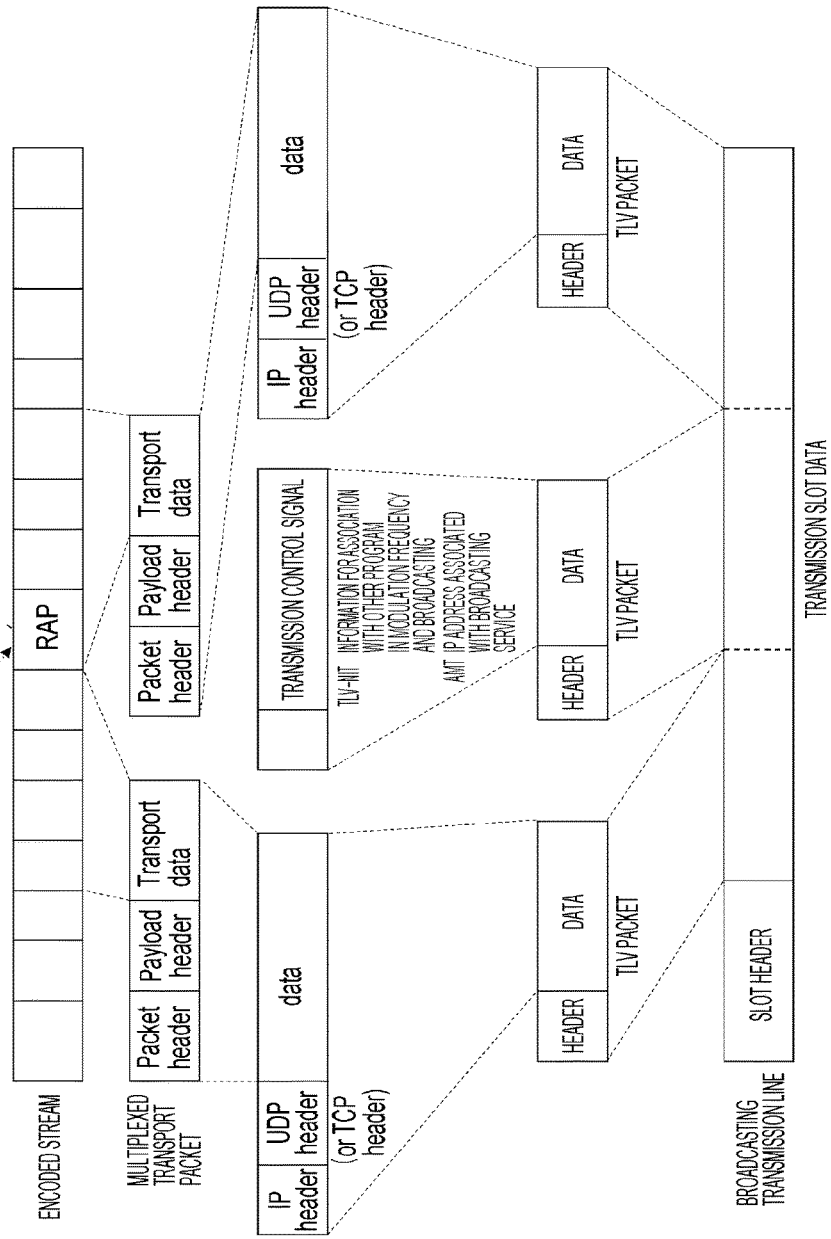

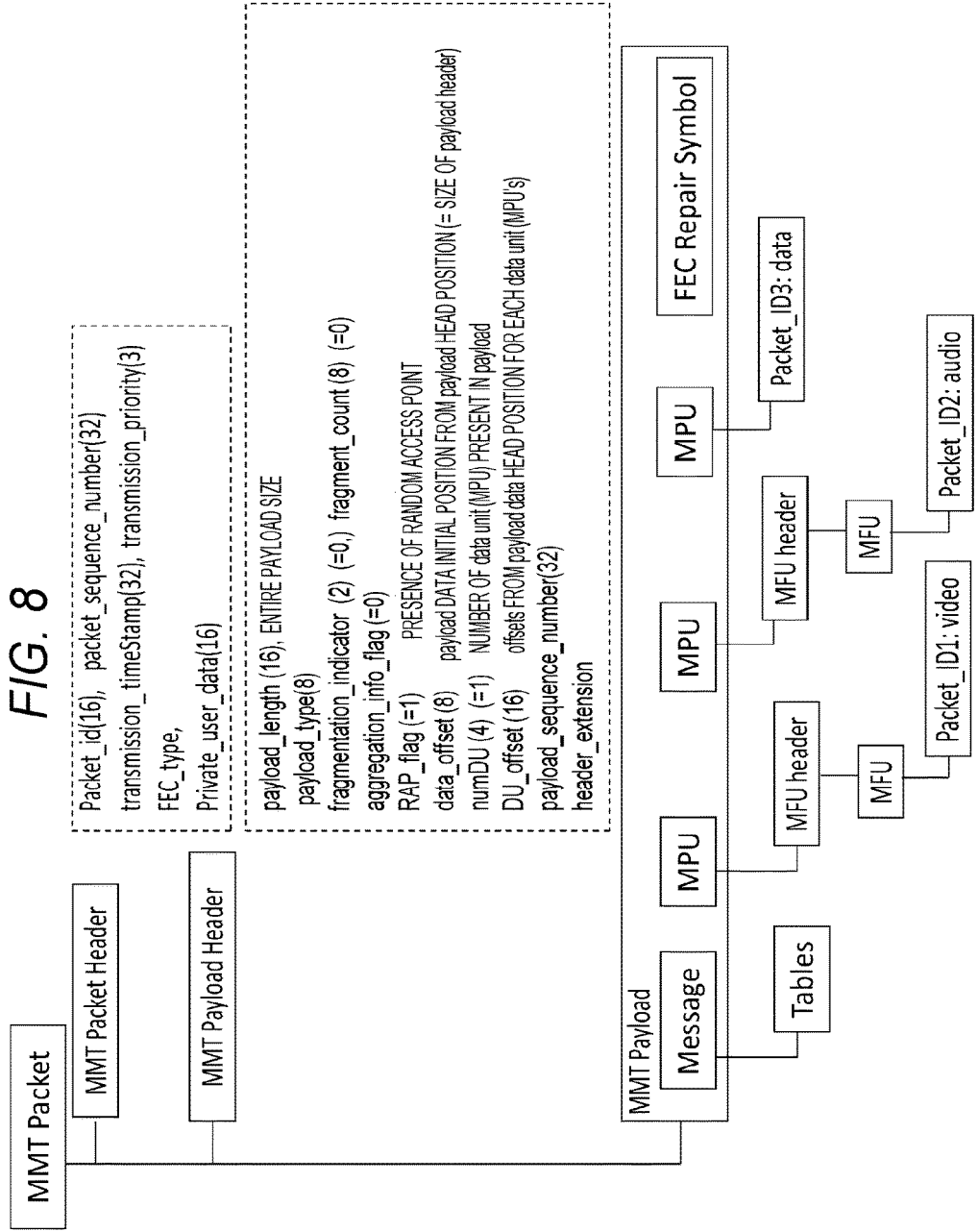

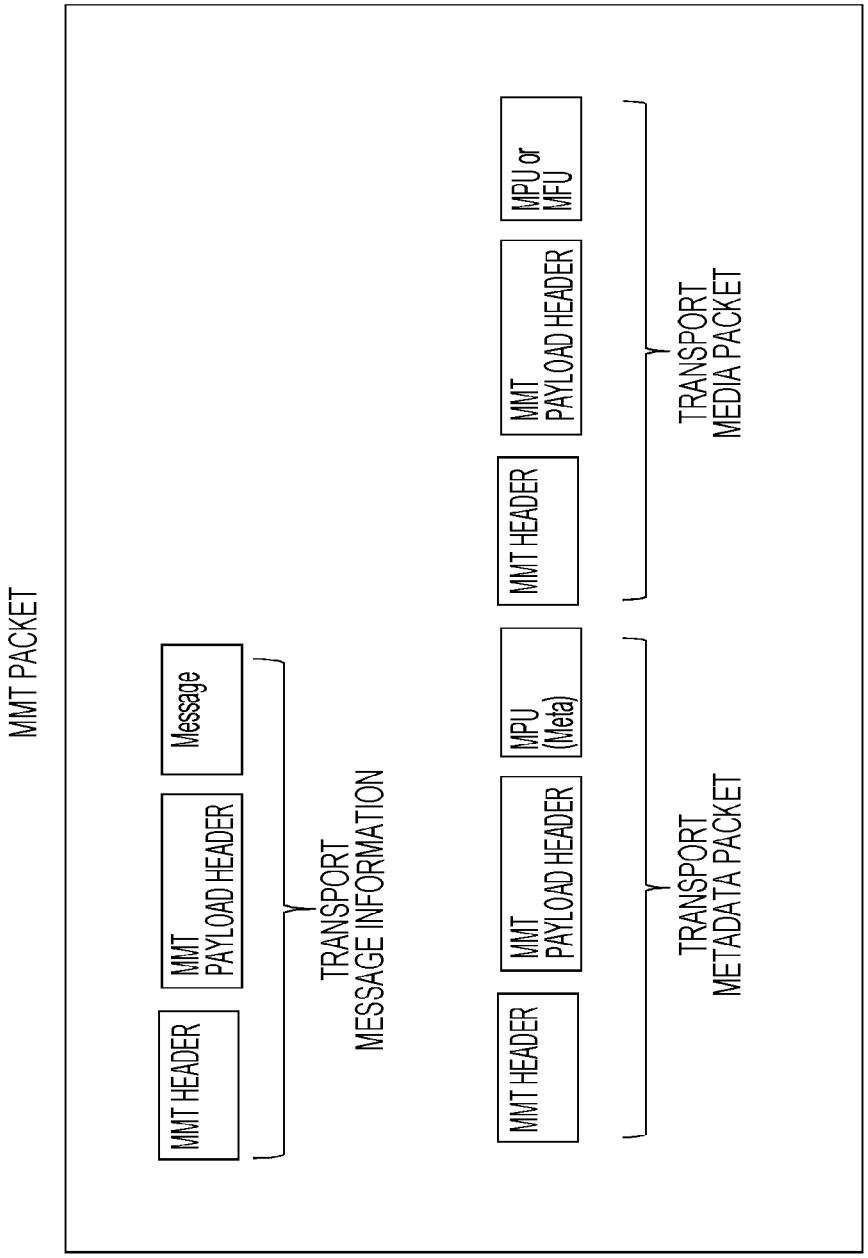

FIG. 10

MMT payload header

| Syntax | No. of Bits | Format |
|---|---|---|
| mmtp_payload_header(){ | | |
| payload_length | 16 | uimsbf |
| payload_type | 8 | bslbf |
| fragmentation_indicator | 2 | bslbf |
| fragment_count_flag | 1 | bslbf |
| aggregation_info_flag | 1 | bslbf |
| random_access_point_flag | 1 | bslbf |
| payload_sequence_number_flag | 1 | bslbf |
| header_extension_field_flag | 1 | bslbf |
| reserved | 1 | bslbf |
| data_offset | 8 | uimsbf |
| if( fragment_count_flag == 1) | | |
| fragment_count | 8 | uimsbf |
| numDU | 8 | uimsbf |
| if (aggregation_info_flag == 1){ | | |
| for ( I = 0 ; I < numDU ; i++ ) | | |
| DU_offset | 16 | uimsbf |
| } | | |
| if (payload_sequence_number_flag == 1) | | |
| payload_sequence_number | 32 | uimsbf |
| if (header_extension_field_flag == 1) | | |
| mmtp_payload_header_extension() | | |
| } | | |

FIG. 11

MMT payload header extension

| Syntax | No. of Bits | Format |
|---|---|---|
| mmtp_payload_header_extension() { | | |
|    payload_header_extension_type | 16 | bslbf |
|    payload_header_extension_length | 16 | uimsbf |
|    if (payload_header_extension_type == 0x01) | | |
|       presentation_timestamp /* in NTP format*/ | 32 | uimsbf |
|    else if (mfu_payload_header_type == 0x02){ | | |
|       decoding_timestamp /* in NTP format*/ | 32 | uimsbf |
|       presentation_timestamp /* in NTP format*/ | 32 | uimsbf |
|    } | | |
|    else if (mfu_payload_header_type == 0x03) | | |
|       presentation_timestamp /* in 90KHz */ | 32 | uimsbf |
|    else if (mfu_payload_header_type == 0x04){ | | |
|       decoding_timestamp /* in 90KHz */ | 32 | uimsbf |
|       presentation_timestamp /* in 90KHz */ | 32 | uimsbf |
|    } | | |
|    else{ | | |
|    } | | |
| } | | |

FIG. 12

| Syntax | No. of Bits | Format |
|---|---|---|
| TLV packet() { | | |
|    TLV_header | 32 | bslbf |
|    TLV_payload | | uimsbf |
| } | | |

FIG. 13

| Syntax | No. of Bits | Format |
|---|---|---|
| TLV_packet{ | | |
| '01' | 2 | bslbf |
| non_priority_bit1 | 1 | bslbf |
| non_priority_bit2 | 1 | bslbf |
| reserved_future_use | 4 | '1111' |
| packet_type | 8 | bslbf |
| length | 16 | uimsbf |
| if (packet_type==0x01) | | uimslbf |
|   IPv4_packet ( ) | | |
| else if (packet_type==0x02) | | |
|   IPv6_packet ( ) | | |
| else if (packet_type==0x03) | | |
|   compressed_ip_packet( ) | | |
| else if (packet_type==0xFE) | | |
|   signalling_packet ( ) | | |
| else if (packet_type==0xFF){ | | |
|   for(i=0;i<N;i++){ | | |
|     NULL | 8 | bslbf |
|   } | | |
| } | | |
| } | | |

FIG. 14

Semantics

| Non_priority_bit1 | (1bits) | |
|---|---|---|
| | 1 | NON-PRIORITY TLV PACKET (NOT CONTAINING DATA STARTING INITIAL BYTE OF ACCESS UNIT AT RANDOM ACCESS POINT) |
| | 0 | PRIORITY TLV type1 PACKET (CONTAINING DATA STARTING INITIAL BYTE OF ACCESS UNIT AT RANDOM ACCESS POINT) |

| Non_priority_bit2 | (1bits) | |
|---|---|---|
| | 1 | NON-PRIORITY TLV PACKET (NOT CONTAINING EITHER TIMING INFORMATION OR START PORTION OF ATTRIBUTE INFORMATION FOR RANDOM ACCESS POINT DISPLAY) |
| | 0 | PRIORITY TLV type2 PACKET (CONTAINING TIMING INFORMATION OR START PORTION OF ATTRIBUTE INFORMATION FOR RANDOM ACCESS DISPLAY) |

FIG. 15 packet type

| packet type value | Assignment |
|---|---|
| 0x00 | Reserved |
| 0x01 | IPv4 packet |
| 0x02 | IPv6 packet |
| 0x03 | Header compressed IP packet |
| 0x04 – 0xFD | Reserved |
| 0xFE | Transmission Control Signal packet |
| 0xFF | Null packet |

FIG. 17

| Internet Protocol headers | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| 0 | | | | | | | | | | 1 | | | | | | | | | | 2 | | | | | | | | | | 3 | |
| 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 | 0 | 1 |
| Version | | | | IHL | | | | TOS/DSCP/ECN | | | | | | | | Total Length | | | | | | | | | | | | | | | |
| Identification | | | | | | | | | | | | | | | | Flags | | | Fragment Offset | | | | | | | | | | | | |
| Time To Live | | | | | | | | Protocol | | | | | | | | Header Checksum | | | | | | | | | | | | | | | |
| Source Address | | | | | | | | | | | | | | | | | | | | | | | | | | | | | | | |
| Destination Address | | | | | | | | | | | | | | | | | | | | | | | | | | | | | | | |
| Optopns | | | | | | | | | | | | | | | | | | | | | | | | Padding | | | | | | | |

FIG. 18

| Version(4) | 4(0x0100) | =Version 4 |
| Hdr Len (4) | | INDICATE LENGTH OF IP HEADER IN UNITS OF 32 BITS. LENGTH OF IP HEADER: 20 BYTES WITHOUT OPTION, AND STORE 5(0x0101). |
| TOS (8) | | Type Of Service. 3-BIT PRIORITY FIELD AND 5-BIT TOS FIELD DEFINED IN SERVICE TYPE FIELD BY RFC1349, BUT THIS FUNCTION IS SCARCELY PROVIDED FOR CONTROL AT PRESENT, AND 3-BIT PRIORITY FIELD INDICATING IMPORTANCE OF IP PACKET ALWAYS INDICATES HIGHEST PRIORITY. |

Total Length in bytes (16)    Packet Length (in Bytes)

Identification (16)    STORE ID NO. IN ORIGINAL IP PACKET
SET FOR IDENTIFYING EACH FRAGMENT IN ORIGINAL IP PACKET FRAGMENT FOR CORRECT RECONSTRUCTION BY INTERMEDIATE ROUTER OR RECEIVER HOST NECESSARY FOR IP PACKET DIVIDED BY FRAGMENTATION.

Flags (3)    INITIAL BIT: UNUSED. SECOND BIT: SPECIFY WHETHER TO ALLOW FRAGMENTATION.
THIRD BIT: INDICATE WHETHER FRAGMENT IS INTERMEDIATE OR END IN ORIGINAL IP PACKET WHEN FRAGMENTED.

Fragment Offset (13)    INDICATE POSITION OF FRAGMENT WHEN IP PACKET IS FRAGMENTED.

Time to Live (8)    INDICATE MAXIMUM PERIOD OF IP PACKET FOR EXISTENCE ON INTERNET.
PURPOSE: PREVENTING PERMANENT CIRCULATION OF IP PACKET NOT FINDING DESTINATION ON NETWORK Protocol (8)    IDENTIFY UPPER LAYER PROTOCOL.
 1  ICMP
 2  IGMP
 3  TCP
 17 UDP
 41 IPv6
 89 OSPF Header Checksum (16)    16-BIT FIELD IN IP HEADER. CHECK ONLY HEADER BY CRC Source IP Address(32)    TRANSMISSION SOURCE IP ADDRESS
Destination IP Address(32)    DESTINATION IP ADDRESS

FIG. 19

Options

| Syntax | No. of Bits | Format |
|---|---|---|
| Options{ | | |
|   type_copy | 1 | bslbf |
|   type_class | 2 | bslbf |
|   type_number | 5 | ustclbf |
|   length | 8 | ustclbf |
|   for( i = 0; i<length; i++) | | |
|     information | 8 | ustclbf |
|   } | | |
| } | | |

FIG. 20

```
type_copy    (1bit)
             1          COPIED IN INITIAL fragment
             0          COPIED IN ALL fragments
type_class   (2bits)    TYPE OF APPLICATION TARGET
             00         Datagram control
             01         reserved
             10         Debugging and Management
             11         reserved
type_number  (5bits)
             00000      End of Option
             00001      No operation
             00011      Loose source route
             00100      Timestamp
             00111      Record route
             01001      Strict source route
             01111      Media Access Priority information
```

FIG. 21

DEFINE INFORMATION FOR DETERMINING INCLUSION OF DATA STARTING INITIAL BYTE OF Access Unit AT RAP, BASED ON Type_number = '01111' (= Media Access Priority Information), AND Length = 2

Media Priority Information (16bits) AT THIS TIME IS:

0x0001    CONTAIN INITIAL BYTE OF Access Unit CONSTITUTING RAP, TIMING INFORMATION, OR START PORTION OF ATTRIBUTE INFORMATION FOR RAP DISPLAY 0x0000    OTHERS others    reserved

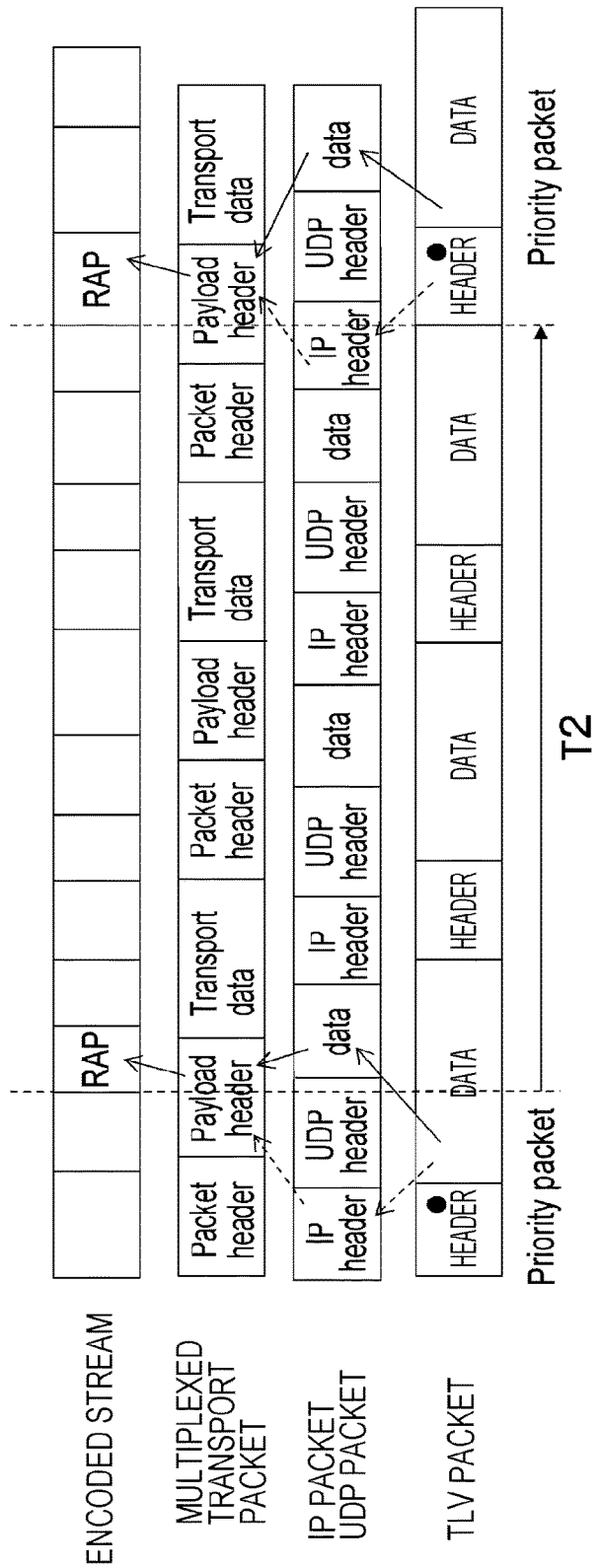

TRANSMISSION DEVICE, TRANSMISSION METHOD OF TRANSMISSION STREAM, AND PROCESSING DEVICE

TECHNICAL FIELD

The present technology relates to a transmission device, a transmission method of a transmission stream, and a processing device, and more particularly to a transmission device and others for transmitting a transmission stream containing transmission packets successively disposed in the transmission stream.

BACKGROUND ART

A capsule layer is provided in some cases as an interface between a physical layer (Physical layer) for modulating a transmission line and an IP packet layer for packetizing data at the time of supply of a service stream on IP packets (for example, see Patent Document 1) Data free from constraint of time, and file downloading have been considered as appropriate information contained in the capsule layer.

CITATION LIST

Patent Document

Patent Document 1: Japanese Patent Application Laid-Open No. 2012-015875

SUMMARY OF THE INVENTION

Problems to be Solved by the Invention

In case of a service containing both a service using broadcasting waves and an IP distribution service, it is possible that the capsule layer is used for transmission of a real-time service, such as a case for transmitting IP packets via broadcasting waves with broadcasting-wave service packets carried on the IP packets, in addition to the conventional use of the capsule layer in a file downloading manner. When the capsule layer has a variable length rather than a fixed length, a transmission target in an upper layer is efficiently transmittable. For example, video or audio is encapsulated in a size of one access unit or larger.

At the time of a trick play such as fast forward (Fast Forward) reproduction, or random access, parsing of variable-length capsules, parsing of multiplexed transports, and decoding of compressed data are executed before presentation. In this case, parsing of variable-length packets present in multiple layers needs to be rapidly completed to shorten a system response time until presentation of initial video or audio.

TLV (Type Length Value) is herein discussed as an example of the capsule layer. In case of TLV, a head of TLV is detectable as an offset position from a transmission slot based on a TMCC inserted into a transmission frame. Subsequently, parsing of IP/UDP and IP/TCP, and parsing of a payload of a transport packet are executed to finally recognize the presence of a picture (picture) to be initially presented.

An object of the present technology is to decrease a response time until initial presentation in such cases as reception of a service, and reproduction of reception data after accumulation of the reception data.

Solutions to Problems

A concept of the present technology is directed to a transmission device including:

a transmission unit that transmits a transmission stream containing transmission packets successively disposed in the transmission stream; and an information insertion unit that inserts, into each of the transmission packets, identification information based on which a packet handled with priority is identifiable.

According to the present technology, the transmission unit transmits a transmission stream containing transmission packets successively disposed in the transmission stream. Then, the information insertion unit inserts, into each of the transmission packets, identification information based on which a packet handled with priority is identifiable. For example, each of the transmission packets may be a multi-layered packet containing a multiplexed transport packet in an upper layer. For example, the information insertion unit may insert the identification information into packets in a part or all of layers of each of the multilayered packets.

For example, the information insertion unit may insert, into packets in a part or all of layers of each of the multilayered packets, identification information based on which a transmission packet handled with priority is identifiable when the corresponding multiplexed transport packet contains an access unit for random access. For example, the information insertion unit may insert, into packets in a part or all of layers of each of the multilayered packets, identification information based on which a transmission packet handled with priority is identifiable when the corresponding multiplexed transport packet contains an access unit necessary for special reproduction.

For example, each of the transmission packets may be a capsule layer packet obtained by encapsulating an IP packet containing the multiplexed transport packet in a payload. In this case, each of the transmission packets may be a TLV packet or a GSE packet, for example. For example, each of the transmission packets may be an IP packet containing the multiplexed transport packet in a payload. For example, each of the multiplexed transport packets may be an MMT packet, an RTP (Real-time Transport Protocol) packet, or a FLUTE (File Delivery over Unidirectional Transport Protocol) packet.

According to the present technology, therefore, identification information based on which a packet handled with priority is identifiable is inserted into each of the transmission packets. In this case, a response time until initial presentation decreases in such cases as reception of a service, and reproduction of reception data after accumulation of the data.

Another concept of the present technology is directed to a processing device including an acquisition unit that acquires a transmission stream containing transmission packets successively disposed in the transmission stream, wherein identification information based on which a packet handled with priority is identifiable is inserted into each of the transmission packets, and the processing device further includes a processing unit that processes the acquired transmission stream.

According to the present technology, the acquisition unit acquires a transmission stream containing transmission packets successively disposed in the transmission stream. The identification information based on which a packet handled with priority is identifiable is inserted into each of the transmission packets. The processing unit processes the acquired transmission stream. For example, each of the transmission packets may be a multilayered packet containing a multiplexed transport packet in an upper layer. In this case, the identification information may be inserted packets in a part or all of layers of each of the multilayered packets.

In this case, each of the transmission packets may be a capsule layer packet, such as a TLV packet or a GSE packet, obtained by encapsulating an IP packet containing the multiplexed transport packet in a payload, for example. In this case, each of the transmission packets may be an IP packet containing the multiplexed transport packet in a payload, for example. For example, each of the multiplexed transport packets may be an MMT packet, an RTP packet, or a FLUTE packet.

For example, the acquisition unit may receive the transmission stream via a predetermined transmission line, and the transmission packet into which the identification information indicating a packet handled with priority is inserted may include the multiplexed transport packet containing an access unit for random access. In this case, the predetermined transmission line may be an RF transmission line or a communication network transmission line, for example.

For example, the acquisition unit may receive the transmission stream from an accumulation medium or a server in response to a reproduction command transmitted to the accumulation medium or the server. In this case, the transmission packet into which the identification information indicating a packet handled with priority is inserted may include the multiplexed transport packet containing an access unit necessary for special reproduction.

According to the present technology, therefore, a transmission stream to be acquired and processed contains the transmission packets successively disposed in the transmission stream, each of which packets includes insertion of identification information based on which a packet handled with priority is identifiable. In this case, a response time until initial presentation decreases in such cases as reception of a service, and reproduction of reception data after accumulation of the data.

Effects of the Invention

According to the present technology, a response time until initial presentation decreases in such cases as reception of a service, or reproduction of reception data after accumulation. Advantageous effects described in this specification are presented only by way of example, wherefore other advantageous effects or additional advantageous effects may be offered.

BRIEF DESCRIPTION OF DRAWINGS

FIG. 3 is a view illustrating a configuration example of TMCC information in a transmission frame.

FIGS. 4(a) and 4(b) are views illustrating chief contents of a configuration example of TMCC information in transmission frames.

FIGS. 6(a) and 6(b) are views illustrating an example where positions of TLV packets are not synchronized with starts of respective transmission frames, and an example where positions of TLV packets are synchronized with starts of respective transmission frames.

FIG. 7 is a view schematically illustrating a packet configuration of transmission protocol stacks.

FIG. 8 is a view illustrating a configuration of an MMT packet in a manner of tree structure.

FIG. 9 is a view illustrating types of the MMT packet.

FIG. 10 is a view illustrating a configuration example of an MMT payload header (mmtp_payload_header( )).

FIG. 11 is a view illustrating a configuration example of an MMT payload header extension in case of transmission of time information in an MMT payload header (MPU payload header).

FIG. 12 is a view illustrating a configuration example of a TLV packet (TLV packet( )).

FIG. 13 is a view illustrating a more detailed configuration example of the TLV packet.

FIG. 14 is a view illustrating identification information inserted into a header of a TLV packet, as information based on which a packet handled with priority is identifiable.

FIG. 15 is a view illustrating a packet type of a TLV packet.

FIG. 17 is a view illustrating a configuration example of an IP (Internet Protocol) header.

FIG. 18 is a view illustrating contents of chief information on a configuration example of an IP header.

FIG. 19 is a view illustrating a configuration example of "Options" within an IP header.

FIG. 20 is a view illustrating contents of chief information on a configuration example of "Options" within an IP header.

FIG. 21 is a view illustrating priority packet identification information defined in "Options" within an IP header.

FIG. 27 is a view illustrating a case of video on-demand (VoD) service via a network, or special reproduction of data locally accumulated.

MODES FOR CARRYING OUT THE INVENTION

A mode for carrying out the invention (hereinafter referred to as "embodiment") is now described. The description is presented in the following order.

1. Embodiment
2. Modified Example

1. Embodiment

[Configuration Example of Presentation System]

Figure 1:
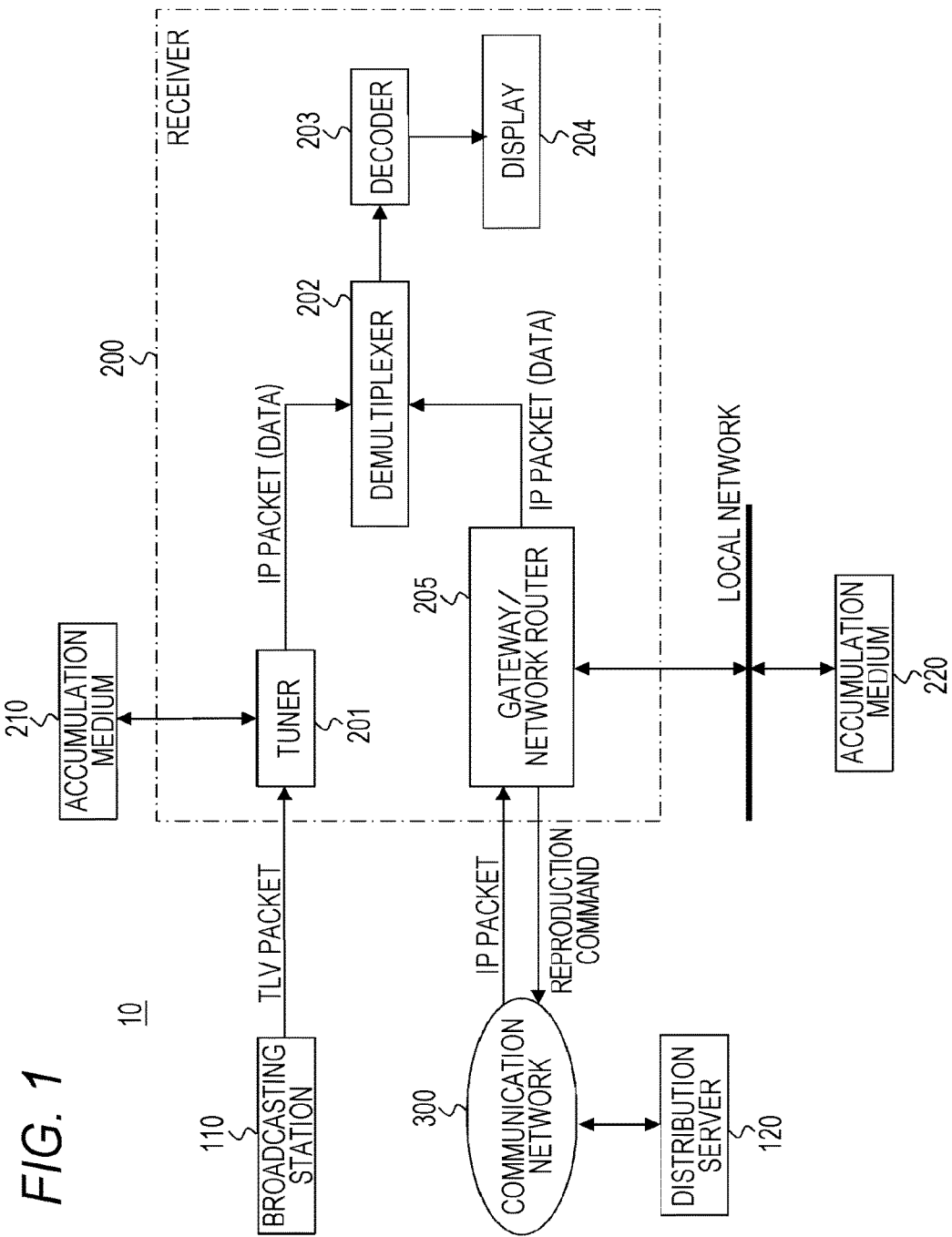
FIG. 1 is a block diagram illustrating a configuration example of a presentation system according to an embodiment.

FIG. 1 illustrates a configuration example of a presentation system 10. According to the presentation system 10, a broadcasting station 110 and a distribution server 120 are disposed on a transmitting side, while a receiver 200 is disposed on a receiving side.

The broadcasting station 110 transmits a transmission stream carried on broadcasting waves to the receiving side via an RF transmission line. The transmission stream is a stream containing TLV (Type Length Value) packets as transmission packets successively disposed in the transmission stream. Each of the TLV packets is a multilayered packet containing a multiplexed transport packet, and media data such as video and audio data in an upper layer. Each of the TLV packets is a capsule layer packet obtained by encapsulating an IP packet containing a multiplexed transport packet in a payload, and a transmission control signal (TLV-NIT, AMT).

Figure 2:
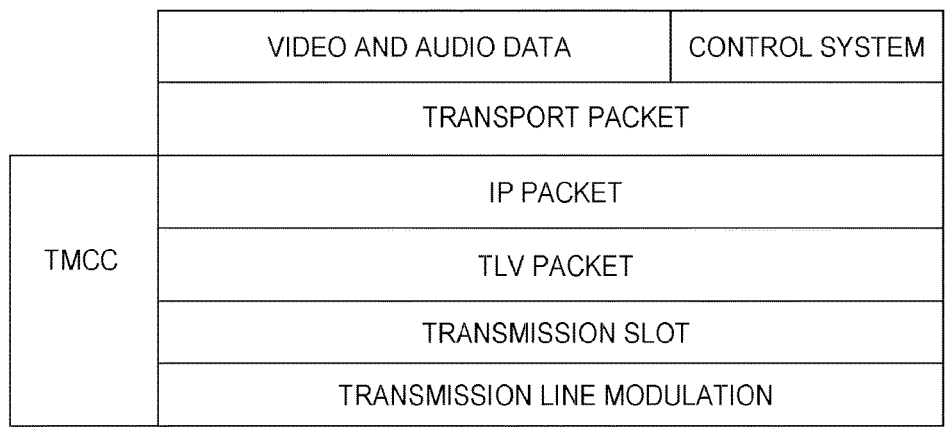
FIG. 2 is a view illustrating transmission protocol stacks.

FIG. 2 illustrates transmission protocol stacks. A transmission line modulation layer is present in the lowest part. A transmission slot is present above the transmission line modulation layer. The transmission slot contains a TLV packet. An IP packet is present above the TLV packet. The multiplexed transport packet containing video, audio, or other media data, and control data is present above the IP packet via a not-shown UDP packet or TCP packet.

One transmission frame is capable of containing maximum 120 transmission slots in accordance with a modulation system. TMCC (Transmission and Multiplexing Configuration Control) information is added to each of the transmission slots. The TMCC information is constituted by information concerning transmission control, such as allocation of a transmission stream to respective transmission slots, and a relationship with a transmission system. An example of the information contained in the TMCC information is pointer information indicating positions of TLV packets in transmission slots. Correct parsing is allowed to start from the beginning of the TLV packets with reference to the pointer information.

An area available for transmission of the TMCC information is 9,422 bits per transmission frame. At the time of switching of the transmission system or the like, the TMCC information transmits after-switching information two frames earlier than the actual switching timing. The minimum update interval for the TMCC information is set to one frame, for example. FIG. 3 illustrates a configuration example (Syntax) of the TMCC information in a transmission frame.

According to an advanced broadband satellite digital broadcasting system, maximum 16 streams are transmittable by one satellite repeater. In the configuration example, "relative stream/slot information" indicates that any one of relative stream numbers from 0 to 15 is allocated to each of slots, and that data on slots having the same relative stream number constitutes one stream.

In the configuration example, "relative stream/transmission stream ID information" allocates a transmission stream ID to each of relative streams of the relative stream numbers 0 through 15. In this case, the transmission stream ID is set to "TS_ID" when the relative stream is an MPEG2-TS, and set to "TLV stream ID" when the relative stream is a TLV. As illustrated in FIG. 4(a), "relative stream/stream type information" indicates a stream type of each relative stream number. For example, "0x01" indicates an MPEG2-S, while "0x02" indicates a TLV, as illustrated in FIG. 4(b).

Figure 5:
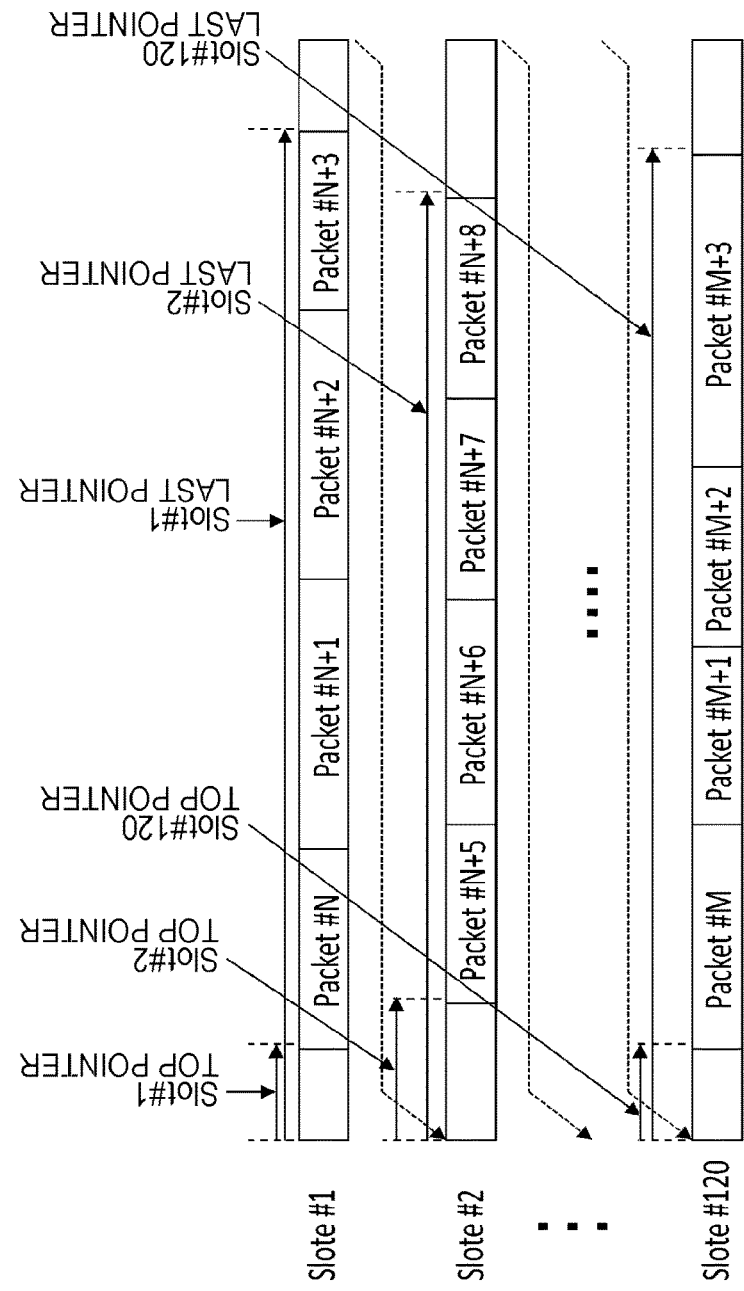
FIG. 5 is a view illustrating storage of TLV packets in data areas of respective slots in transmission frames.

In the configuration example, "pointer/slot information" is constituted by a top pointer and a last pointer for each slot, and chiefly used for packet synchronization and packet invalidation. FIG. 5 illustrates an example of storage of TLV packets in data areas of respective slots. The top pointer indicates an initial packet head byte position in packets stored in each slot. The last pointer indicates a final packet end byte position+1 in packets stored in each slot.

The top pointer "0xFFFF" indicates that a head byte of an initial TLV packet in a slot is absent. This pointer indicates a state that the initial TLV packet in the slot continues from the previous slot. The last pointer "0xFFFF" indicates that a final byte of a final TLV packet in a slot is absent. This pointer indicates a state that the last TLV packet in the slot continues to the subsequent slot.

FIG. 6(a) illustrates an example of a case where a position of a TLV packet is not synchronized with a start of each transmission frame. A start of each slot is uniquely determined for the corresponding transmission frame. A TLV packet is present independently from a slot. When TLV packets cross over a plurality of transmission frames, there exists a TLV packet to be divided by two transmission frames.

FIG. 6(b) indicates an example of a case where a position of a TLV packet is synchronized with a start of each transmission frame. A start of each slot is uniquely determined for the corresponding transmission frame. A TLV packet is not necessarily synchronized with a slot, while a start of each transmission frame corresponds to a start of a TLV packet. More specifically, a start of an initial slot (Slot 1) of each transmission frame corresponds to a start of a TLV packet.

In the case illustrated in FIG. 6(b), an invalid (null) area is often produced in the last part of a transmission frame, wherefore transmission efficiency lowers in comparison with the case illustrated in FIG. 6(a). For simplifying the figures, it is assumed that three slots are present in each transmission frame in the example illustrated in the figures. Practically, maximum 120 slots are allowed to be contained in accordance with the modulation system, as described above.

FIG. 7 schematically illustrates a packet configuration of transmission protocol stacks. A transmission slot is constituted by a slot header and transmission slot data. The transmission slot data contains TLV packets. Each of the TLV packets is constituted by a header and data. This data contains an IP packet or a transmission control signal. The transmission control signal is "TLV-NIT" or "AMT". In this case, "TLV-NIT" is information for association with other programs concerning modulation frequency and broadcasting. On the other hand, "AMT" is an IP address associated with a broadcasting service.

An IP packet is constituted by an IP header, and a UDP packet or a TCP packet as data. The UDP packet herein is constituted by a UDP header and data, while the TCP packet is constituted by a TCP header and data. A multiplexed transport packet is contained as data of the UDP packet or the TCP packet. The multiplexed transport packet is constituted by a packet header, a payload header, and transport data.

The transport data of the multiplexed transport packet data contains a predetermined number of access units of an encoded stream of video, audio or other transmission media. In case of video, 1 access unit corresponds to 1 picture data. In case of audio, 1 access unit corresponds to an access unit of audio collectively containing a predetermined number, such as 1,024, of samples of data. Intra-coded picture encoded data corresponding to a random access point is present in the encoded stream. At the time of random access, this intra-coded picture encoded data is initially decoded.

According to this embodiment, it is assumed that the multiplexed transport packet is a transport packet having MMT (MPEG Media Transport) structure (see ISO/IEC CD 23008-1), i.e., an MMT packet. FIG. 8 illustrates a configuration of an MMT packet in a manner of tree structure.

The MMT packet is constituted by an MMT packet header (MMT Packet Header), an MMT payload header (MMT Payload Header), and an MMT payload (MMT Payload). The MMT payload contains a message (Message), MPUs (Media Processing Units), an FEC repair symbol (FEC Repair Symbol), and others. These are signaled in accordance with a payload type (payload_type) contained in the MMT payload header.

The message herein constitutes information on transmission media. Various types of message contents are inserted into this message in a manner of table structure. Each of the MPUs is fragmented into subdivisions as MFUs (MMT Fragment units) in some cases. In this case, an MFU header (MFU Header) is added to a head of each MFU. The MPUs contained in the MMT payload include an MPU associated with media data such as video, audio, and subtitles, and further include an MPU associated with metadata. The MMT packet containing the respective MPUs is identifiable based on a packet ID (Packet_ID) present in the MMT packet header.

FIG. 9 illustrates types of the MMT packet. An example illustrated in the figure shows classification based on data or information inserted into the payload. Transport message information is an MMT packet containing a message (information on transmission media) in the payload. A transport metadata packet is an MMT packet containing metadata in the payload. This metadata is data in each box of "styp", "sidx", "mmpu", "moov", and "moof" in an MMT file (MP4 file), for example. A transport media data packet is an MMT packet containing video, audio, subtitles, and other media data in the payload.

The MMT payload header includes flag information indicating whether or not intra-coded picture encoded data corresponding to a random access point is present in the MMT payload. FIG. 10 illustrates a configuration example (Syntax) of an MMT payload header (mmtp_payload_header( )).

While not described in detail herein, this MMT payload header contains a payload length (payload_length), a payload type (payload_type), a fragment type (fragment_type), a fragment count (fragment_count), an aggregation info flag (aggregation_info_flag), an RAP flag (random_access_point_flag), a data offset (data_offset), a data unit number (numDU), a data unit offset (DU_offset), a payload sequence number (payload_seq_number), a header extension field flag (header_extension_field_flag), and others.

When the header extension field flag is "1", the MMT payload header further contains an MMT payload header extension (mmtp_payload_header_extension( )). FIG. 11 illustrates a configuration example (Syntax) of the MMT payload header extension thus contained. This configuration example corresponds to transmission of time information (timing information) in the MMT payload header.

A 16-bit field of "payload_header_extension_type" indicates a type of the MMT payload header extension. For example, "0x01" indicates supply of a presentation time stamp (presentation time) in NTP short time format. In the configuration example, "0x02" indicates supply of the presentation time stamp in NTP short time format, and a decode time stamp (decode time). In the configuration example, "0x03" indicates supply of a presentation time stamp with 90 KHz accuracy. In the configuration example, "0x04" indicates supply of the presentation time stamp with 90 KHz, and the decode time stamp.

A 16-bit field of "payload_header_extension_length" indicates a size of the MMT payload header extension. A 32-bit field of "presentation_timestamp" indicates a value of the presentation time stamp (presentation time). A 32-bit field of "decoding_timestamp" indicates a value of the decode time stamp (decode time).

According to this embodiment, the broadcasting station 110 inserts, into a TLV packet, identification information based on which a packet handled with priority is identifiable. In this view, the broadcasting station 110 constitutes an information insertion unit for inserting identification information. FIG. 12 illustrates a configuration example (Syntax) of a TLV packet (TLV paket( )). This TLV packet is constituted by a 32-bit TLV header (TLV_header), and a variable-length TLV payload (TLV_payload).

FIG. 13 illustrates a more detailed configuration example (Syntax) of the TLV packet (TLV packet( )). A 32-bit TLV header (TLV_header) is constituted by a 2-bit field of "01", a 1-bit field of "non_priority_bit1", a 1-bit field of "non_priority_bit2", a 4-bit field of "reserved_future_use", an 8-bit field of "packet_type", and a 16-bit filed of "length".

Flag information indicating whether or not the corresponding packet is a priority TLV type1 packet is newly defined as the 1-bit field of "non_priority_bit1". As illustrated in FIG. 14, "1" indicates that the packet is a non-priority TLV packet, i.e., that the packet does not contain data starting an initial byte (1st byte) of an access unit at a random access point. On the other hand, "0" indicates that the packet is a priority TLV type1 packet, i.e., that the packet contains data starting an initial byte (1st byte) of an access unit at a random access point.

Flag information indicating whether or not the corresponding packet is a priority TLV type2 packet is newly defined as the 1-bit field of "non_priority_bit2". As illustrated in FIG. 14, "1" indicates that the packet is a non-priority TLV packet, i.e., that the packet does not contain either timing information or a start portion of attribute information at the time of random access point presentation. On the other hand, "0" indicates that the packet is a priority TLV type2 packet, i.e., that the packet contains timing information, or a start portion of attribute information at the time of presentation of a random access point presentation.

The TLV packet set to a priority TLV packet is not targeted only at a TLV packet which includes a transport media packet as an MMT packet containing video, audio, or other media data. A TLV packet which includes an MMT packet containing transport message information or a transport metadata packet is also set to a priority TLV packet as necessary.

The 8-bit field of "packet type" indicates a packet type of the TLV packet (see FIG. 15). In the configuration example, "0x01" indicates that IPv4 packet is contained. In the configuration example, "0x02" indicates that IPv6 packet is contained. In the configuration example, "0x03" indicates that an IP packet subjected to header compression is contained. In the configuration example, 0xFE" indicates that a transmission control signal is contained. In the configuration example, "0xFF" indicates that the packet is a null packet. The 16-bit field of "length" indicates a size of a variable-length TLV payload (TLV_payload) continuing from the TLV header (TLV_header).

Figure 16:
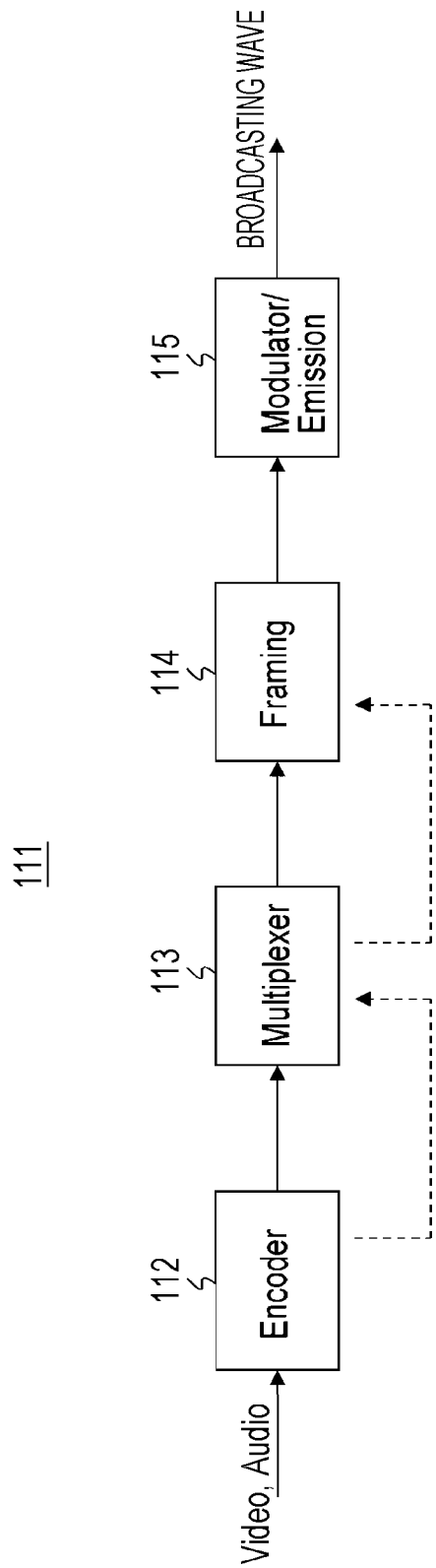
FIG. 16 is a view illustrating an example of a broadcasting wave transmitting system included in a broadcasting station.

FIG. 16 illustrates an example of a broadcasting wave transmitting system 111 included in the broadcasting station 110. The transmitting system 111 includes an encoder unit 112, a multiplexer unit 113, a framing unit 114, and a modulator/emission unit 115. The encoder unit 112 encodes video, audio, or other media data to obtain encoded data. For example, video data is encoded using MPEG4-AVC, or HEVC (high Efficiency Video Coding), for example.

The encoder unit 112 packetizes encoded data such as video and audio data to generate a multiplexed transport packet for each medium. As discussed above, it is assumed that the multiplexed transport packet is an MMT packet in this embodiment, for example. As discussed above, the MMT packet to be practically transmitted includes transport message information and a transport metadata packet in the payload, as well as a transport media packet containing video, audio or other media data (see FIG. 9).

The encoder unit 112 further packetizes a multiplexed transport packet into an UDP or a TCP, and adds an IP header to generate an IP packet containing a multiplexed transport packet. The encoder unit 112 transmits respective IP packets to the multiplexer unit 113. The multiplexer unit 113 multiplexes the respective IP packets.

The multiplexer unit 113 further determines whether or not data of a head byte of an access unit constituting a random access point (intra-coded picture) is contained based on each IP packet containing video, audio or other encoded data. Alternatively, when receiving supply of IP packets containing video, audio or other encoded data from the encoder unit 112, the multiplexer unit 113 simultaneously receives supply of information on an access unit constituting a random access point (intra-coded picture), as indicated by a broken line in the figure.

The multiplexer unit 113 further supplies a multiplexed stream of IP packets to the framing unit 114. At this time, the multiplexer unit 113 supplies, to the framing unit 114, information indicating whether or not data on a head byte of an access unit constituting a random access point (intra-coded picture) is contained in accordance with the supply of IP packets containing video, audio, or other encoded data, as indicated by a broken line in the figure.

The framing unit 114 generates a TLV packet as an encapsulated multiplexed IP packet. The framing unit 114 further generates a TLV packet as an encapsulated transmission control signal (TLV-NIT, AMT). The framing unit 114 sets priority packet identification information contained in a TLV header, i.e., a 1-bit field of "non_priority_bit1" and a 1-bit field of "non_priority_bit2" at the time of encapsulation (see FIGS. 13 and 14).

The framing unit 114 sets the 1-bit field of "non-priority_bit1" to "0" when a TLV packet contains data starting an initial byte of an access unit at a random access point, for indication that the corresponding packet is a priority TLV type1 packet. The framing unit 114 further sets the 1-bit field of "non-priority_bit2" to "0" when a TLV packet contains timing information or a start portion of attribute information at the time of random access point presentation, for indication that the corresponding packet is a priority TLV type2 packet.

The framing unit 114 further executes a framing process for storing respective TLV packets in slots of transmission frames. The framing unit 114 supplies generated transmission frames to the modulator/emission unit 115. The modulator/emission unit 115 executes an RF modulation process for the transmission frames to produce broadcasting waves, and transmits the produced broadcasting waves to the receiving side through an RF transmission line.

Returning to FIG. 1, the distribution server 120 distributes a transmission stream to the receiving side via a communication network 300 by multicast distribution. This transmission stream contains IP packets successively disposed in the stream, as transmission packets containing MMT packets similar to the MMT packets handled by the foregoing broadcasting station 110, for example. Alternatively, the distribution server 120 transmits a transmission stream to the receiving side via the communication network 300 as a video on-demand service. This transmission stream contains predetermined IP packets successively disposed in the stream as transmission packets including MMT packets, in accordance with a reproduction mode based on a reproduction command received from the receiving side. The reproduction mode includes fast forward (Fast forward) reproduction, fast backward (Fast backward) reproduction, and other special reproduction as well as an ordinary reproduction mode.

According to this embodiment, identification information based on which a packet handled with priority is identifiable is inserted into each of IP packets as transmission packets retained in the distribution server 120. FIG. 17 illustrates a configuration example (Syntax) of an IP (Internet Protocol) header. FIG. 18 illustrates contents of chief information (Semantics) of this configuration example.

A 4-bit field of "Version" indicates a version of the IP header. A 4-bit field of "IHL=Hdr Len" indicates a length of the IP header in units of 32 bits. The length of the IP header is set to 20 bytes when no option exists. An 8-bit field of "TOS/DSCP/ECN" is a service type filed. A 16-bit field of "Total Length" indicates a length of the entire IP packet by a number of bytes.

An initial bit in a 3-bit field of "Flags" is unused. The second bit specifies whether to allow fragmentation. The third bit indicates whether the corresponding fragment is an intermediate portion of the original IP packet, or an end of the original IP packet when the IP packet is fragmented. A 13-bit field of "Fragment Offset" indicates a position of the corresponding fragment in the order of fragments when the IP packet is fragmented.

An 8-bit filed of "Time To Live" indicates the maximum period for which the IP packet is allowed to exist on the Internet. This period is specified for the purpose of preventing permanent continuation of circulation of an IP packet on the network as a packet not finding a destination. An 8-bit field of "Protocol" is an identifier for identifying an upper layer protocol. For example, "1" indicates "ICMP", "2" indicates "IGMP", "3" indicates "TCP", "17" indicates "UDP", "41" indicates "IPv6, and "89" indicates "OSPF".

A 16-bit field of "Header Checksum" indicates a CRC for checking the IP header. A 32-bit field of "Source Address" indicates a transmission source IP address. A 32-bit field of "Destination Address" indicates a destination IP service.

FIG. 19 illustrates a configuration example (Syntax) of "Options". FIG. 20 illustrates contents of chief information on this configuration example (Semantics). A 1-bit field of "type_copy" indicates a subject to be copied within an initial fragment at the time of "1", and indicates a subject to be copied in all fragments at the time of "0". In addition, "type_class" indicates a type of a target for application. A 5-bit field of "type_number" indicates a type number. For example, "01111" is newly defined as a type number indicating media access priority information (Media Access Priority Information). An 8-bit field of "length" indicates a size of the subsequent part by a number of bytes.

For example, information or the like for identifying inclusion of an initial byte of an access unit at a random access point is defined by "type_number='01111'" and "length=2" as illustrated in FIG. 21. In a 2-byte "information" in this case, "0x0001" indicates inclusion of an initial byte (1st byte) of an access unit at a random access point, timing information, or a start portion of attribute information at the time of random access point presentation. On the other hand, "0x0000" indicates inclusion of other information.

Allocation of values is not limited to the allocation in this example, but may be allocation in other manners. For example, while "0x0001" indicates inclusion of an initial byte (1st byte) of an access unit at a random access point, the timing information, or a start portion of attribute information at the time of random access point presentation in the foregoing example, the presence of these may be individually indicated by respective values.

Returning to FIG. 1, the receiver 200 includes a tuner 201, a demultiplexer 202, a decoder 203, a display 204, and a gateway/network router 205. The tuner 201 and the gateway/network router 205 constitute an acquisition unit. The tuner 201 receives broadcasting waves transmitted from the transmitting side via an RF transmission line, executes RF demodulation to obtain transmission frames, further executes a deframing process and decapsulating process, and outputs IP packets. The tuner 201 supplies transmission control signals (TLV-NIT, AMT) obtained by decapsulation of TLV packets to a not-shown control unit.

An accumulation medium 210 disposed outside the receiver 200, such as an HDD, is connected with the tuner 201 to allow recording reproduction of a transmission stream obtained by the tuner 201. At the time of reproduction, the tuner 201 transmits a reproduction command to the accumulation medium 210 to receive the reproduced transmission stream from the accumulation medium 210. Then, the tuner 201 executes decapsulation of the received transmission stream, and outputs IP packets. In this case, special reproduction such as fast forward reproduction and fast backward reproduction may be performed as well as ordinary reproduction in accordance with the reproduction mode indicated by the reproduction command.

The tuner 201 supplies output IP packets to the demultiplexer 202. At this time, the tuner 201 supplies priority packet identification information extracted from headers of TLV packets to the demultiplexer 202 in accordance with the supply of the respective IP packets. The demultiplexer 202 executes a process for extracting data for each type of the data (video, audio, metadata, message and the like) contained in the payload from the IP packets received from the tuner 201. The demultiplexer 202 supplies the IP packets extracted for each type to the corresponding decoder 203 together with the priority packet identification information.

The decoder 203 executes a depacketizing process, and further a decoding process as necessary, for the IP packets for each type. The decoder 203 supplies a message or metadata to the not-shown control unit. The decoder 203 supplies video data to the display 204 corresponding to a display unit, and audio data to a not-shown audio output unit, such as a speaker.

Figure 22:
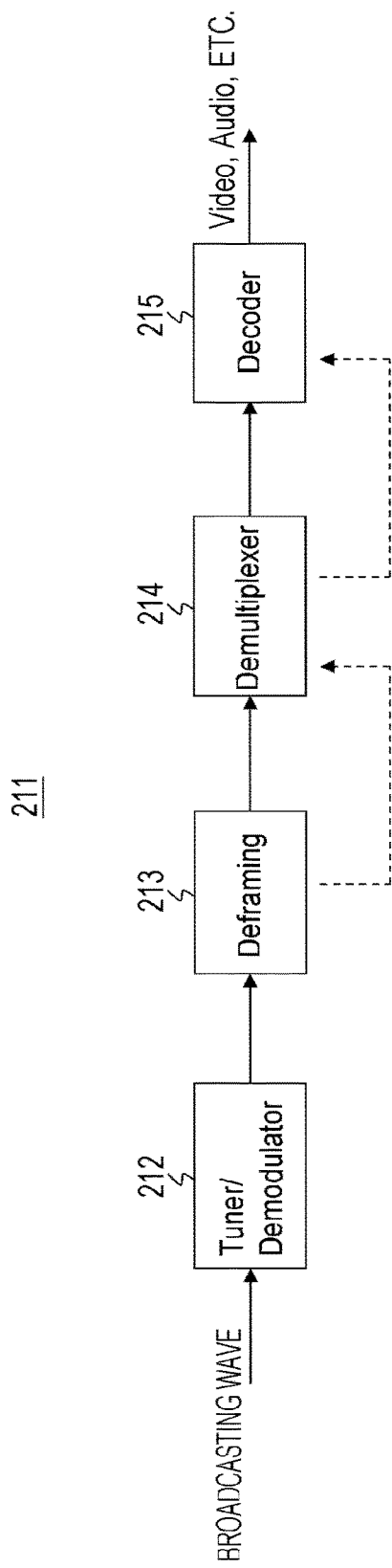
FIG. 22 is a view illustrating an example of a broadcasting wave receiving system included in a receiver.

FIG. 22 illustrates an example of a broadcasting wave receiving system 211 included in the receiver 200. The receiving system 211 includes a tuner/demodulator unit 212, a deframing unit 213, a demultiplexer unit 214, and a decoder unit 215. The tuner/demodulator unit 212 receives broadcasting waves through an RF transmission line, and executes an RF demodulating process to obtain transmission frames containing TLV packets in transmission slots. The tuner/demodulator unit 212 supplies these transmission frames to the deframing unit 213.

The deframing unit 213 extracts TLV packets contained in respective slots from transmission frames. The deframing unit 213 further executes a decapsulating process for the extracted respective TLV packets to obtain IP packets or transmission control signals (TLV-NIT, AMT).

The deframing unit 213 supplies the obtained transmission control signals to the not-shown control unit. The deframing unit 213 further supplies the obtained IP packets to the demultiplexer 214. At this time, the deframing unit 213 also supplies priority packet identification information contained in TLV headers to the demultiplexer unit 214 in accordance with the supply of the respective IP packets, as illustrated in a broken line in the figure. As discussed above, this priority packet identification information is constituted by the 1-bit filed of "non_priority_bit1", and the 1-bit field of "non_priority_bit2" (see FIG. 13).

The demultiplexer unit 214 executes a process for extracting data for each type of data contained in the payload from the IP packets received from the deframing unit 213. The demultiplexer unit 214 supplies the IP packets extracted for each type to the corresponding decoder unit 215. At this time, the demultiplexer unit 214 also supplies the priority packet identification information to the decoder unit 215 as indicated by a broken line in accordance with the supply of the respective IP packets.

The decoder unit 215 executes a depacketizing process, and further a decoding process as necessary, for the IP packets for each type. The decoder unit 215 supplies a message or metadata to the not-shown control unit. The decoder unit 215 supplies video data to a not-shown display unit, and audio data to a not-shown audio output unit.

Returning to FIG. 1, the gateway/network router unit 205 receives a transmission stream of a service distributed from the distribution server 120 via the communication network 300 by multicast distribution, and outputs IP packets similar to the output from the foregoing tuner 201. Each header of the IP packets contains priority packet identification information. This priority packet identification information is information on the header option "type=01111", and "information" as discussed above (see FIGS. 19 through 21).

An accumulation medium 220 disposed outside the receiver 200, such as an HDD, is connected with the gateway/network router unit 205 via a local network to allow recording reproduction of a transmission stream received by the gateway/network router unit 205. At the time of reproduction, the gateway/network router unit 205 transmits a reproduction command to the accumulation medium 220 to receive a reproduced transmission stream from the accumulation medium 220, and outputs IP packets constituting the transmission frame. In this case, special reproduction such as fast forward reproduction and fast backward reproduction may be executed as well as normal reproduction in accordance with the reproduction mode indicated by the reproduction command.

Alternatively, the gateway/network router unit 205 transmits a reproduction command to the distribution server 120 to receive a transmission stream of a video on-demand service from the distribution server 120 via the communication network 300, and outputs IP packets similar to the IP packets output by the foregoing multicast distribution. In this case, the mode of the transmission stream transmitted from the distribution server 120 corresponds to the reproduction mode indicated by the reproduction command. The reproduction mode includes fast forward reproduction, fast backward reproduction, or other special reproduction as well as the normal reproduction mode.

The gateway/network router unit 205 supplies output IP packets to the demultiplexer 202. The demultiplexer 202 executes a process for extracting data for each type (such as video, audio, metadata, and messages) contained in the payload from the IP packets received from the gateway/network router unit 205. The demultiplexer 202 supplies the IP packets extracted for each type to the corresponding decoder 203.

The decoder 203 executes a depacketizing process, and further a decoding process as necessary, for the IP packets for each type. The decoder 203 supplies a message or metadata to the not-shown control unit. The decoder 203 supplies video data to the display 204 corresponding to a display unit, and audio data to a not-shown audio output unit, such as a speaker.

Operation of the presentation system 10 illustrated in FIG. 1 is hereinafter described. Initially discussed is a process executed for broadcasting waves received by the tuner 201 of the receiver 200 from the broadcasting station 110. In this case, the broadcasting station 110 transmits broadcasting waves to the receiving side via an RF transmission line. The broadcasting waves carry a transmission stream which includes TLV packets as transmission packets successively disposed in the stream. The tuner 201 of the receiver 200 receives these broadcasting waves.

The tuner 201 executes an RF demodulation process for the received broadcasting waves to obtain transmission frames, and further executes a deframing process and decapsulation to output IP packets. In this case, transmission control signals (TLV-NIT, AMT) obtained by decapsulation of TLV packets are supplied to the not-shown control unit.

The IP packets output from the tuner 201 are supplied to the demultiplexer 202. At this time, priority packet identification information extracted from headers of the TLV packets is also supplied from the tuner 201 to the demultiplexer 202 in accordance with the supply of the respective IP packets. The demultiplexer 202 executes a process for extracting data for each type (such as video, audio, metadata, and messages) contained in the payload from the IP packets sequentially supplied from the tuner 201.

The IP packets for each type extracted by the demultiplexer 202 are supplied to the corresponding decoder 203 together with the priority packet identification information. The decoder 203 executes a depacketizing process, and further executes a decoding process as necessary, for the IP packets for each type. Video data obtained by the decoder 203 is supplied to the display 204 corresponding to a display unit to presentation an image. On the other hand, audio data video data obtained by the decoder 203 is supplied to a not-shown audio output unit, such as a speaker, to output voices. Messages and metadata obtained by the decoder 203 are supplied to the not-shown control unit.

Described hereinafter is operation executed at the time of broadcasting channel switching (random access) caused in response to operation by a user. In this case, a target of a presentation process executed by the receiver 200 starts from an initial random access point (RAP) of a transmission stream after the channel switching. This random access point is targeted at a head of an access unit constituted only by non-predictive components (I picture, IDR picture), or a start point of message information associated with this access unit.

Figure 23:
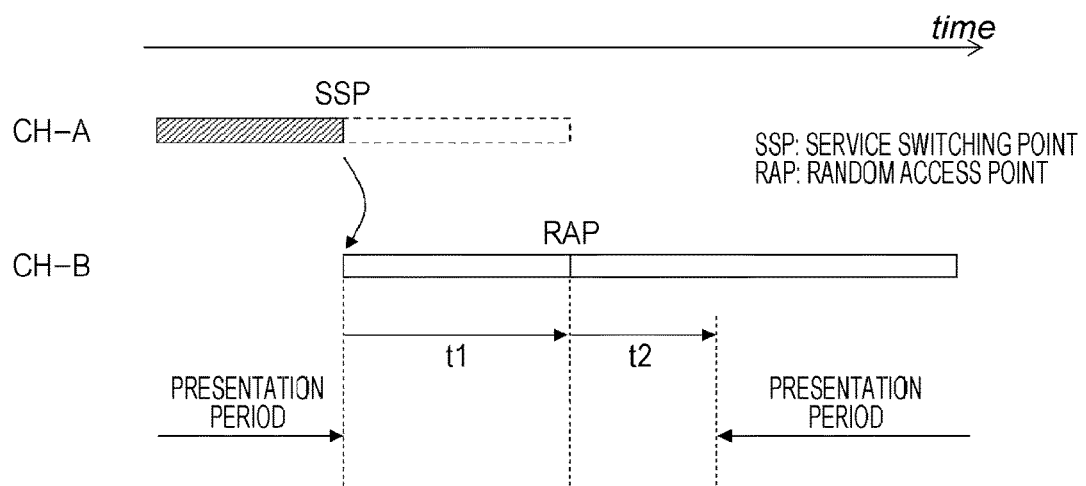
FIG. 23 is a view illustrating a presentation delay at the time of channel switching (random access).

FIG. 23 illustrates an example of switching from a channel A (CH-A) to a channel B (CH-B) at a service switching point SSP. In this case, at least a delay t1 is produced from SSP to RAP until presentation is restarted. In addition, when a prediction difference picture (P picture, B picture) referring to a picture disposed before I picture in the order of presentation is present after RAP, a delay t2 is also produced due to the presence of the prediction difference picture.

According to this embodiment, a process for parsing a header of each packet in a transmission stream until an initial random access point (RAP) is appropriately omissible based on the priority packet identification information contained in headers of TLV packets. In this case, a delay until decoding and presentation of a picture at an initial random access point decreases, wherefore a response time until initial presentation decreases.

Figure 24:
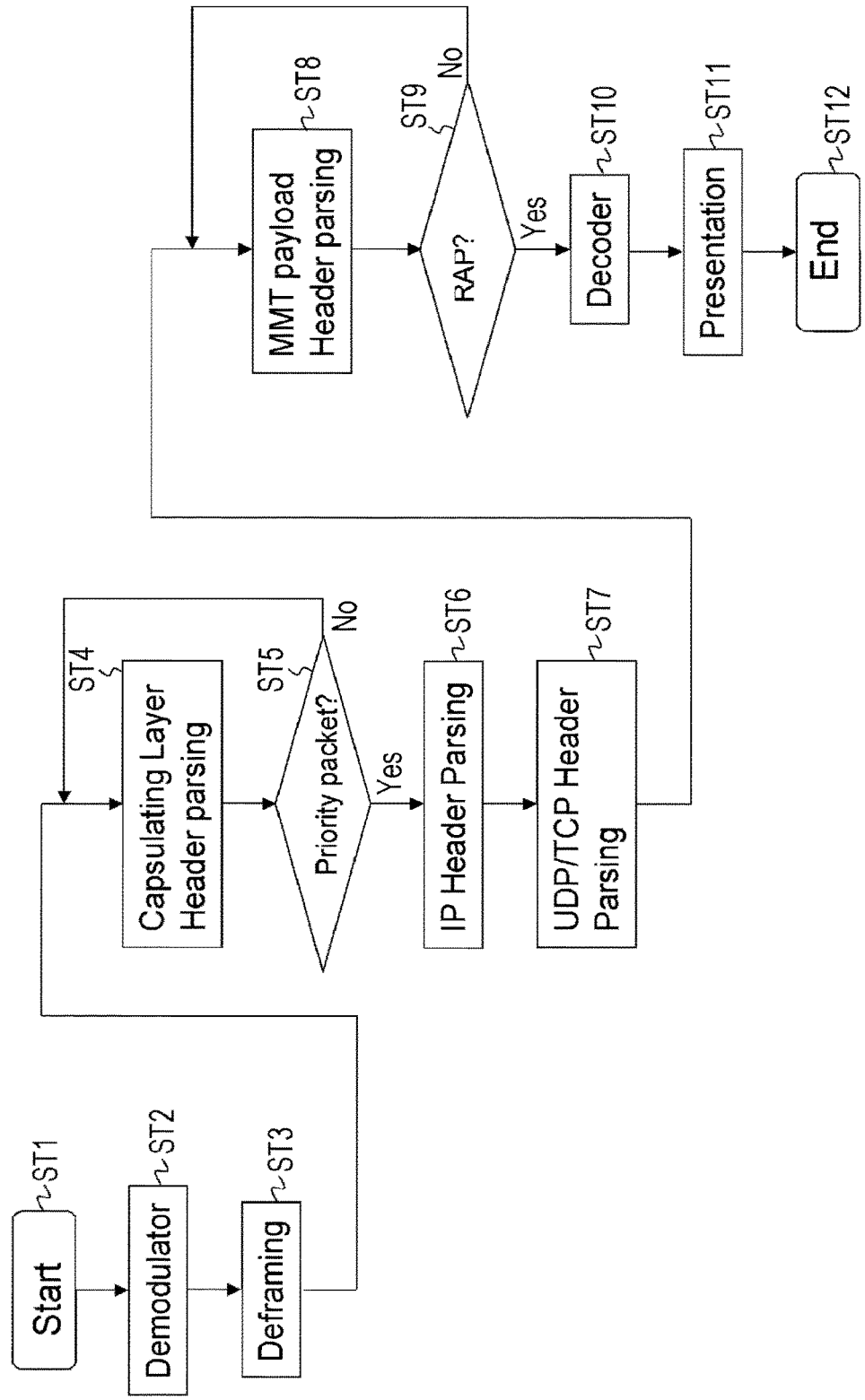
FIG. 24 is a flowchart schematically illustrating an example of a process executed until decoding and presentation of a picture at an initial random access point.

A flowchart illustrated in FIG. 24 schematically shows a process executed until decoding and presentation of a picture at an initial random access point. In step ST1, the receiver 200 starts the process at a service switching point (random access position). Then, the receiver 200 executes a demodulating process in step ST2, and executes deframing to extract a TLV packet from a transmission frame in step ST3.

In step ST4, the receiver 200 parses a header of the TLV packet. In step ST5, the receiver 200 determines whether or not priority identification information contained in the header indicates a priority packet. More specifically, the receiver 200 determines whether or not "Non_priority_bit1=0" is indicated. When the receiver 200 determines that the information indicates a priority packet, the process proceeds to step ST6.

In step ST6, the receiver 200 parses an IP header. In step ST7, the receiver 200 parses a header of UDP or TCP. In step ST8, the receiver 200 parses an MMT payload header. In step ST9, the receiver 200 determines whether or not "random_access_point_flag" indicates RAP. When determining that RAP is indicated, the receiver 200 starts decoding in step ST10, starts presentation in step ST11, and ends the process in step ST12.

Figure 25:
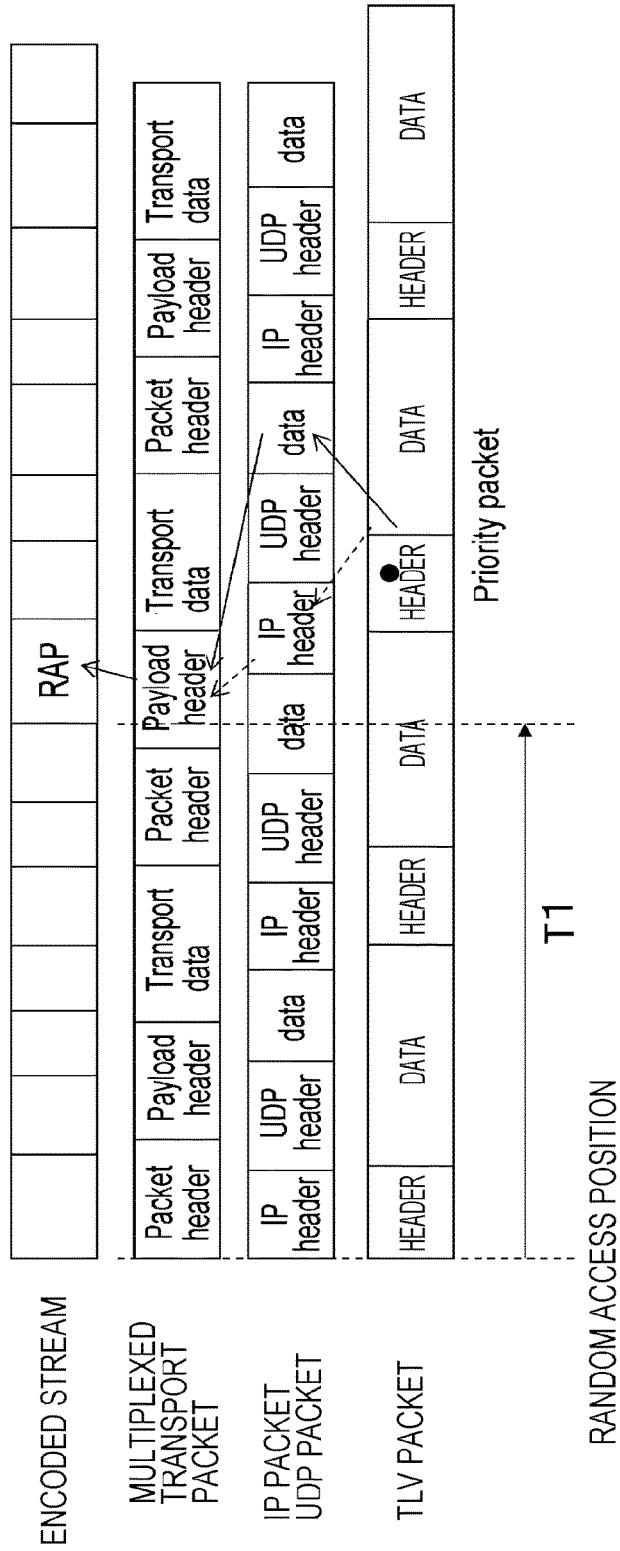
FIG. 25 is a view illustrating a case of broadcasting channel switching or multicast distribution service switching.

Solid arrows in FIG. 25 indicate search routes for finding a random access point in an encoded stream based on the foregoing flowchart illustrated in FIG. 24. In this case, hierarchical packet parsing from the random access position (service switching time) to the random access point (RAP) is unnecessary, but only checking of a header in the TLV packet on the lowermost layer is required. Accordingly, a delay T1 until decoding and presentation of a picture at an initial random access point becomes the minimum after random access.

The foregoing example is a case of an IP packet contained in a TLV packet and not including insertion of identification information based on which a packet handled with priority is identifiable. However, it is possible that this IP packet contained in the TLV packet includes identification information similar to the identification information of an IP packet corresponding to a transmission packet retained in the distribution server 120 (see FIGS. 19 through 21).

Figure 26:
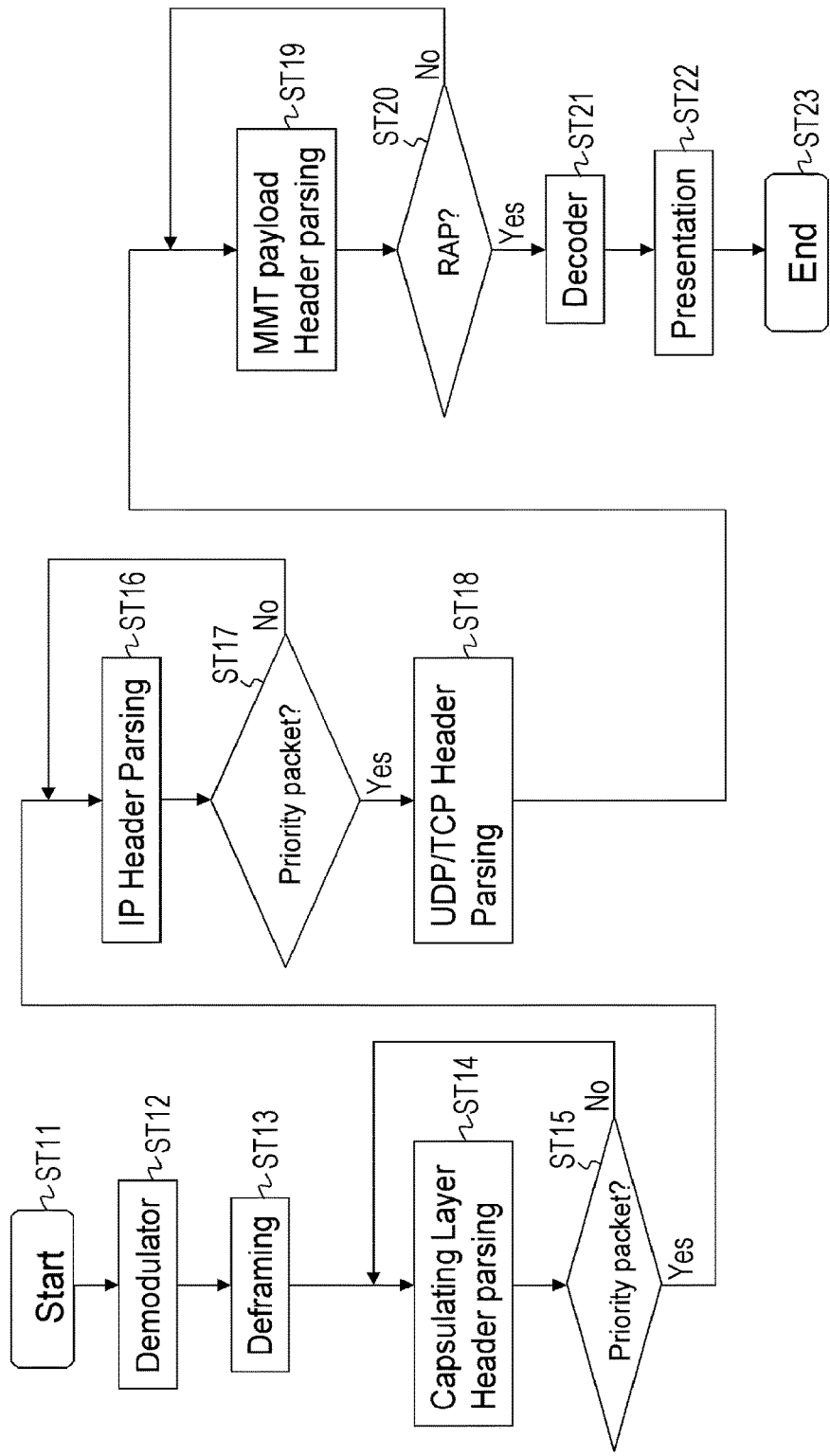
FIG. 26 is a flowchart schematically illustrating another example of a process executed until decoding and presentation of a picture at an initial random access point.

A flowchart illustrated in FIG. 26 schematically shows a process executed in this case until decoding and presentation of a picture at an initial random access point. In step ST11, the receiver 200 starts the process at a service switching point (random access position). In step ST12, the receiver 200 executes a demodulating process, and executes deframing in step ST13 to extract a TLV packet from a transmission frame.

In step ST14, the receiver 200 parses a header of the TLV packet. In step ST15, the receiver 200 determines whether or not priority packet identification information contained in the header indicates a priority packet. For example, the receiver 200 determines whether or not "Non_priority_bit1=0" is indicated. When the receiver 200 determines that a priority packet is indicated, the process proceeds to step ST16.

In step ST16, the receiver 200 parses an IP header. In step ST17, the receiver 200 determines whether or not the priority packet identification information contained in the header indicates a priority packet. For example, the receiver 200 determines whether or not "type=01111" is indicated, and whether or not the 16-bit "information" is "0x0001". When the receiver 200 determines that a priority packet is indicated, the process proceeds to a step in ST18.

In step ST18, the receiver 200 parses a header of UDP or TCP. In step ST19, the receiver 200 parses an MMT payload header. In step ST20, the receiver 200 determines whether or not "random_access_point_flag" is RAP. When RAP is indicated, the receiver 200 starts decoding in step ST21, starts presentation in step ST22, and ends the process in step ST23.

Broken arrows in FIG. 25 indicate search routes for finding a random access point in an encoded stream based on the foregoing flowchart illustrated in FIG. 26. Similarly to the above case, hierarchical packet parsing from the random access position (service switching point) to the random access point is unnecessary, but only checking of a header of a TLV packet on the lowest layer is required. Accordingly, the delay T1 until decoding and presentation of a picture at the initial random access point becomes the minimum.

Described next is operation executed at the time of special reproduction, such as fast forward reproduction, based on a reproduction command transmitted to the accumulation medium 210 in response to operation by the user. In this case, TLV packets containing access units at random access points (RAPs) are selectively extracted from the accumulation medium 210, for example. Then, a transmission stream containing these TLV packets is returned to the tuner 201 as a reproduction transmission stream.

The tuner 201 decapsulates the TLV packets contained in the transmission stream supplied from the accumulation medium 210, and outputs IP packets. In this case, transmission control signals (TLV-NIT, AMT) obtained by decapsulation of TLV packets are supplied to the not-shown control unit.

The IP packets output from the tuner 201 are supplied to the demultiplexer 202. The demultiplexer 202 executes a process for extracting data for each type of data (video and audio) contained in the payload from the IP packets sequentially supplied from the tuner 201. The IP packets for each type extracted by the demultiplexer 202 are supplied to the corresponding decoder 203 together with the priority packet identification information.

The decoder 203 executes a depacketizing process, and further a decoding process for the IP packets for each type. Video data obtained by the decoder 203 is supplied to the display 204 corresponding to the display unit, where an image of special reproduction, such as fast forward reproduction is displayed. On the other hand, audio data obtained by the decoder 203 is supplied to the not-shown audio output unit, such as a speaker, where a voice corresponding to the display image is output.

At the time of selective extraction of TLV packets containing access units at random access points (RAPs) from the accumulation medium 210, a process for parsing headers of respective packets in the transmission stream between respective random access points (RAPs) is appropriately omissible based on priority packet identification information contained in the headers of the TLV packets. Accordingly, a load and required time for selective extraction of the TLV packets containing access units at random access points (RAPs) decrease.

While not explained in detail herein, a process for finding TLV packets containing random access points (RAPs) in the accumulation medium 210 is executed in a manner similar to the process for finding TLV packets containing access units at random access points (RAPs) executed at the time of the foregoing random access (see FIG. 24).

Solid arrows in FIG. 27 indicate search routes for finding random access points in an encoded stream when packet identification information is inserted only in headers of TLV packets in the accumulation medium 210 as described above. In this case, hierarchical packet parsing in an interval T2 between random access points is unnecessary, wherefore a processing load produced in the accumulation medium 210 decreases. Accordingly, a reproduction speed at the time of fast forward reproduction increases, for example. Broken arrows in FIG. 27 indicate search paths for finding random access points in an encoded stream when packet identification information is inserted into headers of IP packets as well as headers of TLV packets.

Discussed next is a process executed for a transmission stream of a service transmitted from the distribution server 120 via the communication network 300 and received by the gateway/network router 205 of the receiver 200. In this case, IP packets contained in the received transmission stream are output from the gateway/network router 205. Each header of the IP packets contains priority packet identification information.

The IP packets output from the gateway/network router 205 are supplied to the demultiplexer 202. The demultiplexer 202 executes a process for extracting data for each type (such as video, audio, metadata, and messages) contained in the payload from the IP packets sequentially supplied from the tuner 201.

The IP packets for each type extracted by the demultiplexer 202 are supplied to the corresponding decoder 203 together with the priority packet identification information. The decoder 203 executes a depacketizing process, and further executes a decoding process as necessary, for the IP packets for each type. Video data obtained by the decoder 203 is supplied to the display 204 corresponding to a display unit to presentation an image. On the other hand, audio data video data obtained by the decoder 203 is supplied to a not-shown audio output unit, such as a speaker, to output voices. Messages and metadata obtained by the decoder 203 are supplied to the not-shown control unit.

Described herein is operation executed at the time of service switching of multicast distribution (random access) caused in response to operation by the user. In this case, a target of a presentation process executed by the receiver 200 starts from an initial random access point (RAP) of the transmission stream after service switching. This random access point is targeted at a head of an access unit constituted only by non-predictive components (I picture, IDR picture), or a start point of message information associated with this access unit.

While not described in detail herein, a process for parsing headers of respective packets in the transmission stream until the initial random access point (RAP) is appropriately omissible based on priority packet identification information contained in the headers of the IP packets similarly to the foregoing case of broadcasting channel switching (see FIG. 25). Accordingly, a delay until decoding and presentation of a picture at the initial random access point decreases, wherefore a response time until initial presentation decreases.

Described next is operation executed at the time of special reproduction, such as fast forward reproduction, based on a reproduction command transmitted to the accumulation medium 220 in response to operation by the user. In this case, IP packets containing access units at random access points (RAPs) are selectively extracted from the accumulation medium 220. Then, a transmission stream containing these IP packets is returned to the gateway/network router 205 as a reproduction transmission stream.

The gateway/network router 205 outputs the IP packets contained in the transmission stream supplied from the accumulation medium 220. The demultiplexer 202 executes a process for extracting data for each type (video and audio) contained in the payload from the IP packets sequentially supplied from the gateway/network router 205. The IP packets extracted by the demultiplexer 202 for each type are supplied to the corresponding decoder 203.

The decoder 203 executes a depacketizing process, and further a decoding process for the IP packets for each type. Video data obtained by the decoder 203 is supplied to the display 204 corresponding to the display unit, where an image of special reproduction, such as fast forward reproduction is displayed. On the other hand, audio data obtained by the decoder 203 is supplied to the not-shown audio output unit, such as a speaker, where a voice corresponding to the display image is output.

At the time of selective extraction of IP packets containing access units at random access points (RAPs) from the accumulation medium 220, a process for parsing headers of respective packets in the transmission stream between respective random access points (RAPS) is appropriately omissible based on priority packet identification information contained in headers of the IP packets. Accordingly, a load and required time for selective extraction of IP packets containing access units at random access points (RAPs) decrease.

Described next is operation executed for special reproduction, such as fast forward reproduction, at the time of reception of a transmission stream based on a reproduction command transmitted to the distribution server 120 in response to operation by the user. In this case, the distribution server 120 selectively extracts IP packets containing access units at random access points (RAPs), for example, based on priority packet identification information contained in headers of IP packets, and returns a transmission stream containing these IP packets to the gateway/network router 205.

The gateway/network router 205 outputs the IP packets contained in the transmission stream supplied from the distribution server 120. The demultiplexer 202 executes a process for extracting data for each type (video and audio) contained in the payload from the IP packets sequentially supplied from the gateway/network router 205. The IP packets for each type extracted by the demultiplexer 202 are supplied to the corresponding decoder 203 together with the priority packet identification information.

The decoder 203 executes a depacketizing process, and further a decoding process for the IP packets for each type. Video data obtained by the decoder 203 is supplied to the display 204 corresponding to the display unit, where an image of special reproduction, such as fast forward reproduction is displayed. On the other hand, audio data obtained by the decoder 203 is supplied to the not-shown audio output unit, such as a speaker, where a voice corresponding to the display image is output.

According to the presentation system 10 illustrated in FIG. 1 and described above, identification information for determining whether or not a transmission packet (TLV packet or TP packet) contained in a transmission stream transmitted from the transmitting side is a packet to be handled with priority is inserted into the corresponding packet. Accordingly, a response time until initial presentation on the receiving side is allowed to decrease in such cases as reception of a service, and reproduction after accumulation of reception data.

For example, a delay until decoding and presentation of a picture at an initial random access point becomes the minimum after random access when this identification information is used at the time of broadcasting channel switching or multicast distribution service switching. Moreover, a processing load and required time for special reproduction, such as fast forward reproduction, decrease by the use of this identification information at the time of special reproduction of data locally accumulated.

2. Modified Example

According to the embodiment described above, TLV packets are used as capsule layer packets for broadcasting by way of example. However, capsule layer packets are not limited to TLV packets, but may be GSE (Generic Stream Encapsulation) packets, or other packets having a function similar to the function of these packets. Similarly, multiplexed transport packets are not limited to MMT packets. For example, RTP (Real-time Transport Protocol) packets, or FLUTE (File Delivery over Unidirectional Transport protocol) packets may be used.

According to the embodiment described above, the receiver 200 includes an output unit, i.e., a display, a speaker or other output units. However, the output portion and the like of the receiver 200 may be separately provided. In this case, the receiver becomes a device having a configuration of a set top box.

The present technology may have the following configurations.

(1) A transmission device including:

a transmission unit that transmits a transmission stream containing transmission packets successively disposed in the transmission stream; and an information insertion unit that inserts, into each of the transmission packets, identification information based on which a packet handled with priority is identifiable.

(2) The transmission device according to (1) noted above, wherein each of the transmission packets is a multilayered packet containing a multiplexed transport packet in an upper layer.

(3) The transmission device according to (2) noted above, wherein the information insertion unit inserts the identification information into packets in a part or all of layers of each of the multilayered packets.

(4) The transmission device according to (3) noted above, wherein the information insertion unit inserts, into packets in a part or all of layers of each of the multilayered packets, identification information based on which a transmission packet handled with priority is identifiable when the corresponding multiplexed transport packet contains an access unit for random access.

(5) The transmission device according to (3) noted above, wherein the information insertion unit inserts, into packets in a part or all of layers of each of the multilayered packets, identification information based on which a transmission packet handled with priority is identifiable when the corresponding multiplexed transport packet contains an access unit necessary for special reproduction.

(6) The transmission device according to any one of (2) through (5) noted above, wherein each of the transmission packets is a capsule layer packet obtained by encapsulating an IP packet containing the multiplexed transport packet in a payload.

(7) The transmission device according to (6) noted above, wherein each of the transmission packets is a TLV packet or a GSE packet.

(8) The transmission device according to (2) through (5) noted above, wherein each of the transmission packets is an IP packet containing the multiplexed transport packet in a payload.

(9) The transmission device according to any one of (2) through (8) noted above, wherein each of the multiplexed transport packets is an MMT packet, an RTP packet, or a FLUTE packet.

(10) A transmission method of a transmission stream including:
- transmitting a transmission stream containing transmission packets successively disposed in the transmission stream; and
- inserting, into each of the transmission packets, identification information based on which a packet handled with priority is identifiable.

(11) A processing device including an acquisition unit that acquires a transmission stream containing transmission packets successively disposed in the transmission stream, wherein
identification information based on which a packet handled with priority is identifiable is inserted into each of the transmission packets, and
the processing device further includes a processing unit that processes the acquired transmission stream.

(12) The processing device according to (11) noted above, wherein
each of the transmission packets is a multilayered packet containing a multiplexed transport packet in an upper layer, and
the identification information is inserted into packets in a part or all of layers of each of the multilayered packets.

(13) The processing device according to (12) noted above, wherein each of the transmission packets is a capsule layer packet obtained by encapsulating an IP packet containing the multiplexed transport packet in a payload.

(14) The processing device according to (13) noted above, wherein each of the transmission packets is a TLV packet or a GSE packet.

(15) The processing device according to (12) noted above, wherein each of the transmission packets is an IP packet containing the multiplexed transport packet in a payload.

(16) The processing device according to any one of (12) through (15) noted above, wherein each of the multiplexed transport packets is an MMT packet, an RTP packet, or a FLUTE packet.

(17) The processing device according to any one of (12) through (15) noted above, wherein
the acquisition unit receives the transmission stream via a predetermined transmission line, and
the transmission packet into which the identification information indicating a packet handled with priority is inserted includes the multiplexed transport packet containing an access unit for random access.

(18) The processing device according to (17) noted above, wherein the predetermined transmission line is an RF transmission line or a communication network transmission line.

(19) The Processing Device According to any One of (12) through (15) noted above, wherein
the acquisition unit receives the transmission stream from an accumulation medium or a server in response to a reproduction command transmitted to the accumulation medium or the server, and
the transmission packet into which the identification information indicating a packet handled with priority is inserted includes the multiplexed transport packet containing an access unit necessary for special reproduction.

The present technology is chiefly characterized in that a response speed until initial presentation decreases at the time of random access, for example, by inserting identification information, based on which information a packet handled with priority is identifiable, into a capsule layer packet (transmission packet) obtained by encapsulating an IP packet containing a multiplexed transport packet in a payload (see FIGS. 1 and 13).

REFERENCE SIGNS LIST

10 Presentation system
110 Broadcasting station
111 Transmitting system
112 Encoder unit
113 Multiplexer unit
114 Framing unit
115 Modulator/emission unit
120 Distribution server
200 Receiver
201 Tuner
202 Demultiplexer
203 Decoder
204 Display
205 Gateway/network router
210 Accumulation medium
211 Receiving system
212 Tuner/demodulator unit
213 Deframing unit
214 Demultiplexer unit
215 Decoder unit
220 Accumulation medium

The invention claimed is:

1. A transmission device, comprising:
circuitry configured to, for each transmission packet of transmission packets successively disposed in a transmission stream:
determine whether each data packet that is encapsulated in a particular transmission packet has first identification information indicating that the data packet is to be handled with priority;
set second identification information in the particular transmission packet to a first value in a case that at least one data packet that is encapsulated in the particular transmission packet is determined to have the first identification information, the second identification information being disposed outside the data packet, and the first value of the second identification information indicating presence of the first identification information within the particular transmission packet; and
set the second identification information to a second value in a case that no data packet that is encapsulated in the particular transmission packet is determined to have the first identification information, the second value of the second identification information indicating absence of the first identification information within the particular transmission packet; and
a transmitter configured to transmit the transmission stream with the set second identification information.

2. The transmission device according to claim 1, wherein the transmission packet is a multilayered packet containing a multiplexed transport packet in an upper layer.

3. The transmission device according to claim 2, wherein the circuitry is configured to insert the second identification information into packets in a part or all of layers of the transmission packet.

4. The transmission device according to claim 3, wherein the first identification information indicates that the data packet to be handled with priority is a transport packet that contains an access unit for random access of a video.

5. The transmission device according to claim 3, wherein the first identification information indicates that the data packet to be handled with priority is a transport packet that contains an access unit for non-sequential reproduction of a video.

6. The transmission device according to claim 2, wherein the transmission packet encapsulates an IP packet containing the multiplexed transport packet in a payload of the IP packet.

7. The transmission device according to claim 6, wherein the transmission packet is a Type Length Value (TLV) packet or a Generic Stream Encapsulation (GSE) packet.

8. The transmission device according to claim 2, wherein the transmission packet is an IP packet containing the multiplexed transport packet in a payload of the IP packet.

9. The transmission device according to claim 2, wherein the multiplexed transport packet is an MPEG Media Transport (MMT) packet, a Real-time Transport Protocol (RTP) packet, or a File Delivery over Unidirectional Transport protocol (FLUTE) packet.

10. A transmission method for a transmission stream, the method comprising:
for each transmission packet of transmission packets successively disposed in the transmission stream,
determining whether each data packet that is encapsulated in a particular transmission packet has first identification information indicating that the data packet is to be handled with priority,
setting, by circuitry of a transmission device, second identification information in the particular transmission packet to a first value in a case that at least one data packet that is encapsulated in the particular transmission packet is determined to have the first identification information, the second identification information being disposed outside the data packet, and the first value of the second identification information indicating presence of the first identification information within the particular transmission packet, and
setting, by the circuitry of the transmission device, the second identification information to a second value in a case that no data packet that is encapsulated in the particular transmission packet is determined to have the first identification information, the second value of the second identification information indicating absence of the first identification information within the particular transmission packet; and
transmitting, by a transmitter of the transmission device, the transmission stream with the set second identification information.

11. A processing device, comprising:
circuitry configured to:
acquire a transmission stream containing transmission packets successively disposed in the transmission stream;
for each transmission packet of the transmission packets,
determine whether each data packet that is encapsulated in a particular transmission packet has first identification information indicating that the data packet is to be handled with priority,
set second identification information in the particular transmission racket to a first value in a case that at least one data packet that is encapsulated in the particular transmission packet is determined to have the first identification information, the second identification information being disposed outside the data packet, and the first value of the second identification information indicating presence of the first identification information within the particular transmission packet, and
set the second identification information to a second value in a case that no data packet that is encapsulated in the particular transmission packet is determined to have the first identification information, the second value of the second identification information indicating absence of the first identification information within the particular transmission packet; and
a transmitter configured to transmit the transmission stream with the set second identification information.

12. The processing device according to claim 11, wherein the one of the transmission packets is a multilayered packet containing a multiplexed transport packet in an upper layer, and
the second identification information is inserted into packets in a part or all of layers of the one of the transmission packets.

13. The processing device according to claim 12, wherein the one of the transmission packets is a capsule layer packet obtained by encapsulating an IP packet containing the multiplexed transport packet in a payload of the IP packet.

14. The processing device according to claim 13, wherein the one of the transmission packets is a Type Length Value (TLV) packet or a Generic Stream Encapsulation (GSE) packet.

15. The processing device according to claim 12, wherein the one of the transmission packets is an IP packet containing the multiplexed transport packet in a payload of the IP packet.

16. The processing device according to claim 12, wherein the one of the multiplexed transport packets is an MPEG Media Transport (MMT) packet, a Real-time Transport Protocol (RTP) packet, or a File Delivery over Unidirectional Transport protocol (FLUTE) packet.

17. The processing device according to claim 12, wherein the circuitry is configured to acquire the transmission stream via a predetermined transmission line, and
the first identification information indicates that the data packet to be handled with priority is a transport packet containing an access unit for random access of a video.

18. The processing device according to claim 17, wherein the predetermined transmission line is an RF transmission line or a communication network transmission line.

19. The processing device according to claim 12, wherein the circuitry is configured to acquire the transmission stream from an accumulation medium or a server in response to a reproduction command transmitted to the accumulation medium or the server, and
the first identification information indicates that the data packet to be handled with priority is a transport packet containing an access unit for non-sequential reproduction of a video.

* * * * *